(12) United States Patent
Hashimoto et al.

(10) Patent No.: US 9,017,798 B2
(45) Date of Patent: Apr. 28, 2015

(54) PRESS-FORMED PRODUCT

(71) Applicant: Topre Corporation, Chuo-Ku, Tokyo (JP)

(72) Inventors: Yasuharu Hashimoto, Kanagawa (JP); Yusuke Tezuka, Kanagawa (JP)

(73) Assignee: Topre Corporation, Tokyo (JP)

( * ) Notice: Subject to any disclaimer, the term of this patent is extended or adjusted under 35 U.S.C. 154(b) by 48 days.

(21) Appl. No.: 13/815,803

(22) Filed: Mar. 15, 2013

(65) Prior Publication Data
US 2013/0260103 A1    Oct. 3, 2013

(30) Foreign Application Priority Data
Mar. 29, 2012  (JP) ................................ 2012-075548

(51) Int. Cl.
| | |
|---|---|
| B62D 25/06 | (2006.01) |
| E04B 7/06 | (2006.01) |
| B60R 13/02 | (2006.01) |
| B60R 21/213 | (2011.01) |
| B21D 11/10 | (2006.01) |
| B21D 22/26 | (2006.01) |

(52) U.S. Cl.
CPC . B62D 25/06 (2013.01); E04B 7/06 (2013.01); B60R 13/025 (2013.01); B21D 22/26 (2013.01); B60R 21/213 (2013.01); B21D 11/10 (2013.01)

(58) Field of Classification Search
CPC ........ B21D 11/10; B21D 22/26; B62D 25/06; B62D 25/00; B32B 3/28; B60R 21/213; B60R 13/025; E04B 7/06
USPC ............. 428/174, 603, 595; 296/216.09, 210, 296/214; 52/381, 836, 846
See application file for complete search history.

(56) References Cited

U.S. PATENT DOCUMENTS

| | | | |
|---|---|---|---|
| 5,356,695 A * | 10/1994 | Mori et al. ..................... | 428/174 |
| 2010/0201158 A1* | 8/2010 | Miyashita ................ | 296/193.01 |
| 2012/0204619 A1* | 8/2012 | Maeda et al. ................ | 72/379.2 |

FOREIGN PATENT DOCUMENTS

JP      2009073420      4/2009

\* cited by examiner

*Primary Examiner* — Aaron Austin
*Assistant Examiner* — Jasper Saberi
(74) *Attorney, Agent, or Firm* — Kilpatrick Townsend & Stockton LLP

(57) ABSTRACT

A press-formed product includes a top panel portion and a side panel portion connected to the top panel portion through a bent portion that is curved so as to have an arc shape. The top panel portion includes a recessed portion that is curved so as to have an arc shape in a direction opposite to a direction in which the bent portion is curved.

9 Claims, 20 Drawing Sheets
(5 of 20 Drawing Sheet(s) Filed in Color)

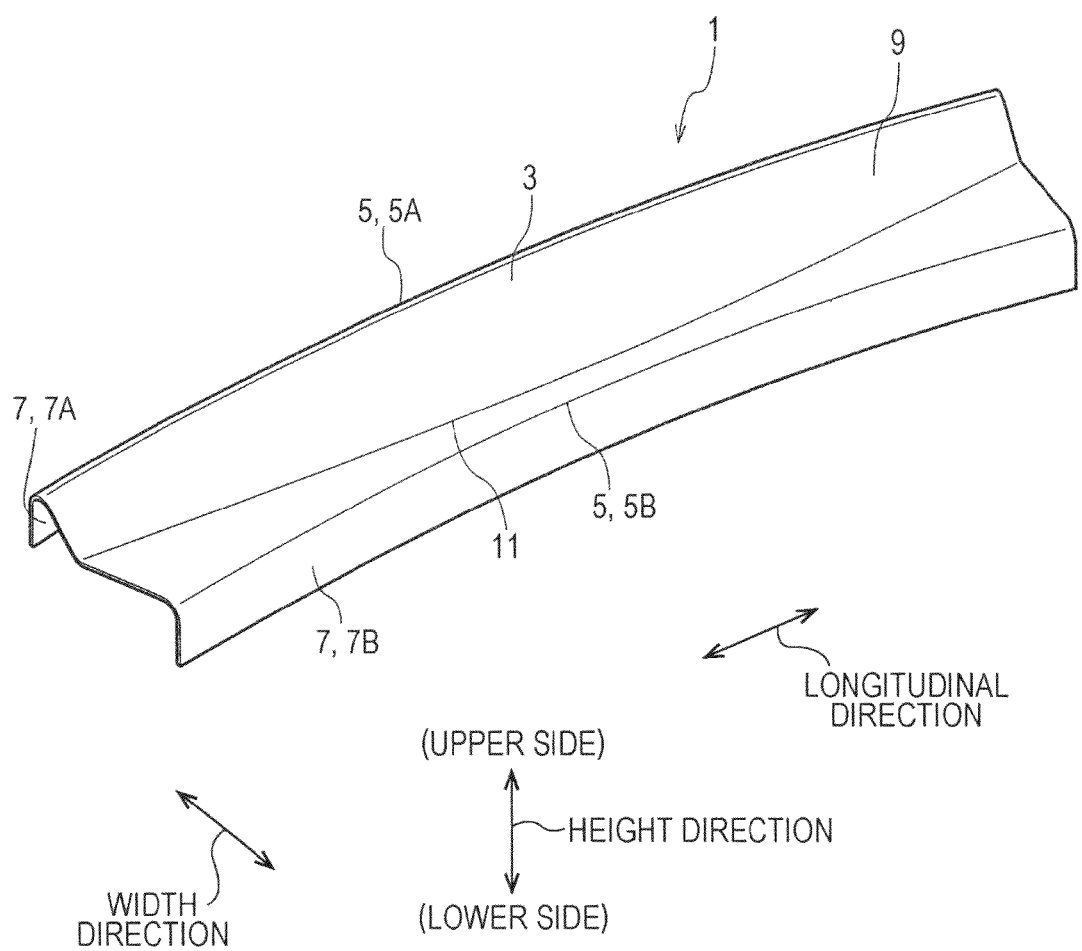

FIG. 6A
FIG. 6B
FIG. 6C
FIG. 6D
FIG. 6E
FIG. 6F
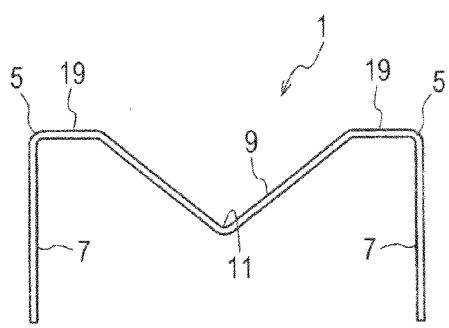
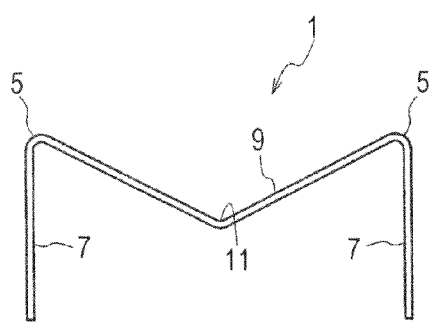
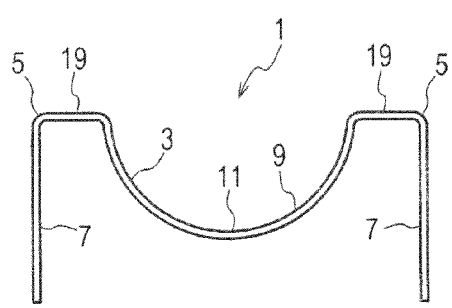
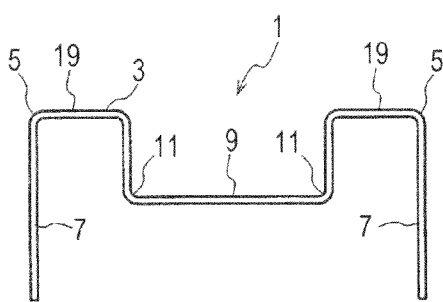
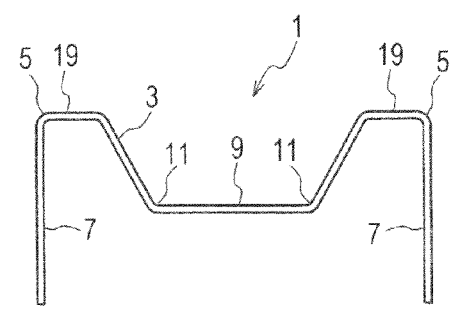
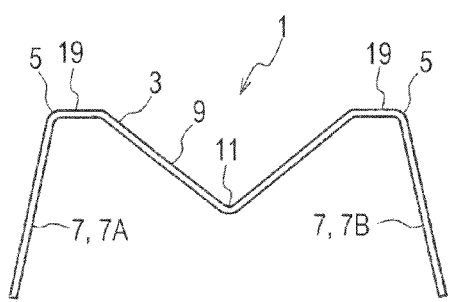

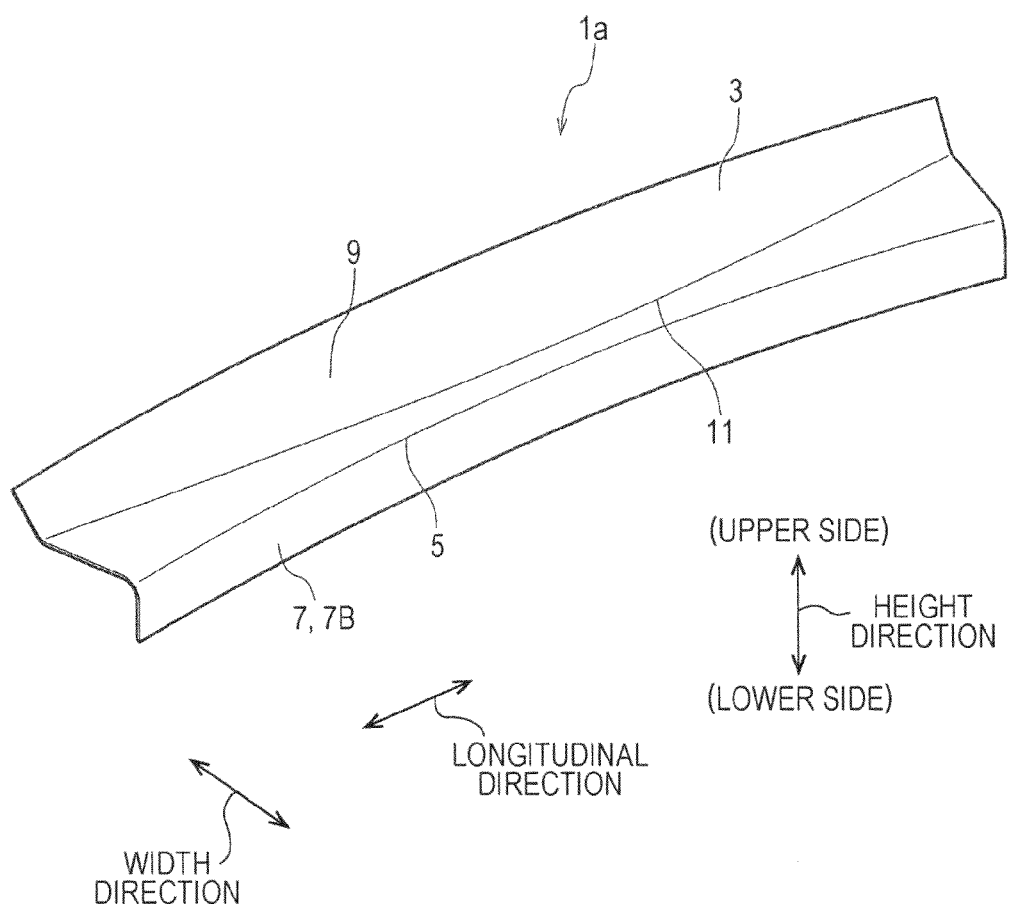

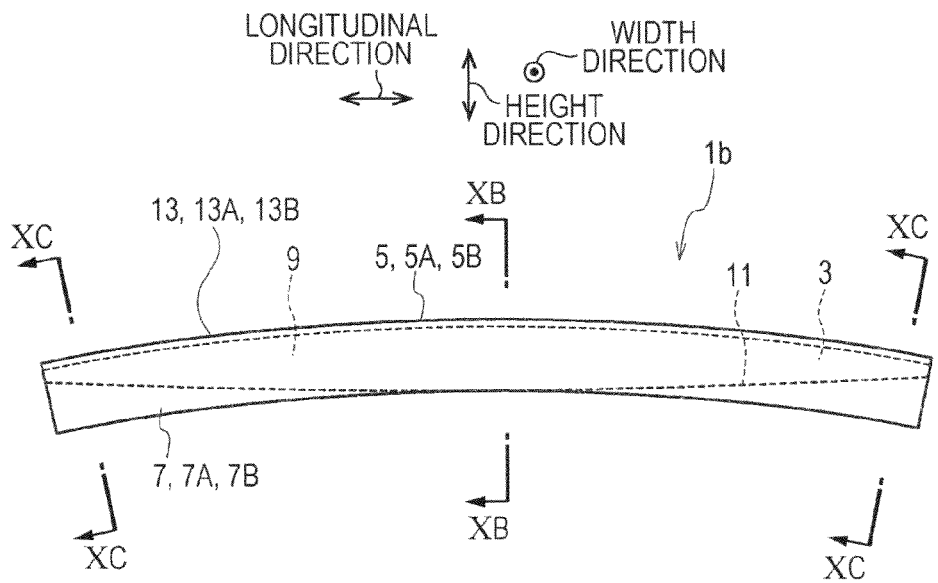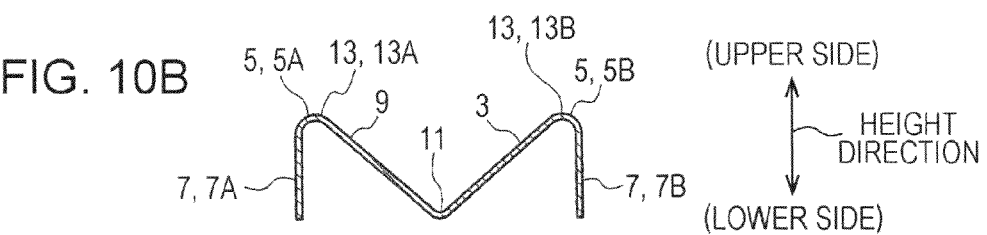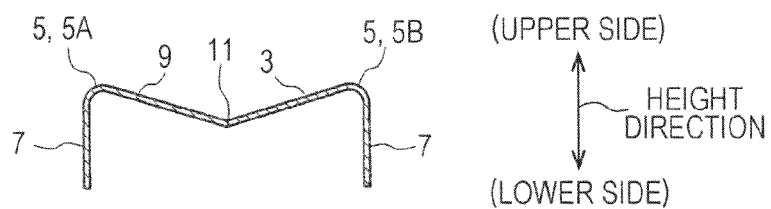

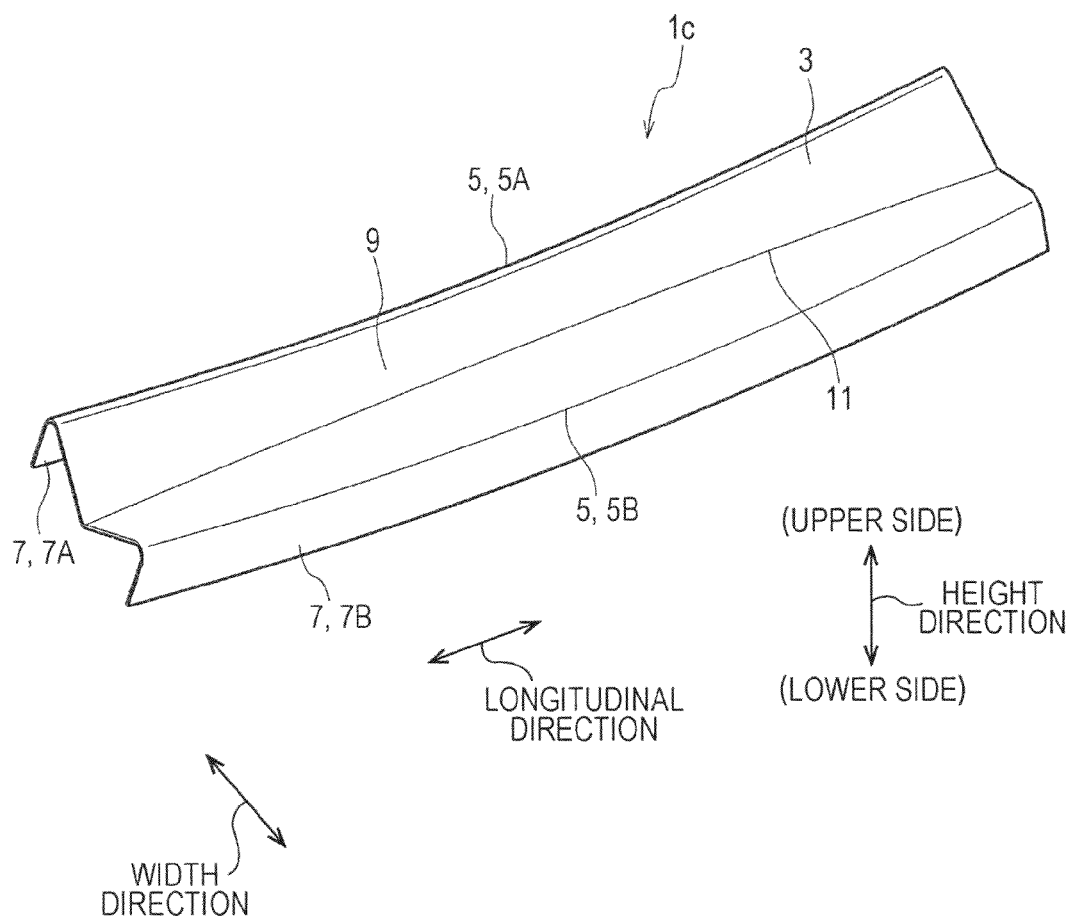

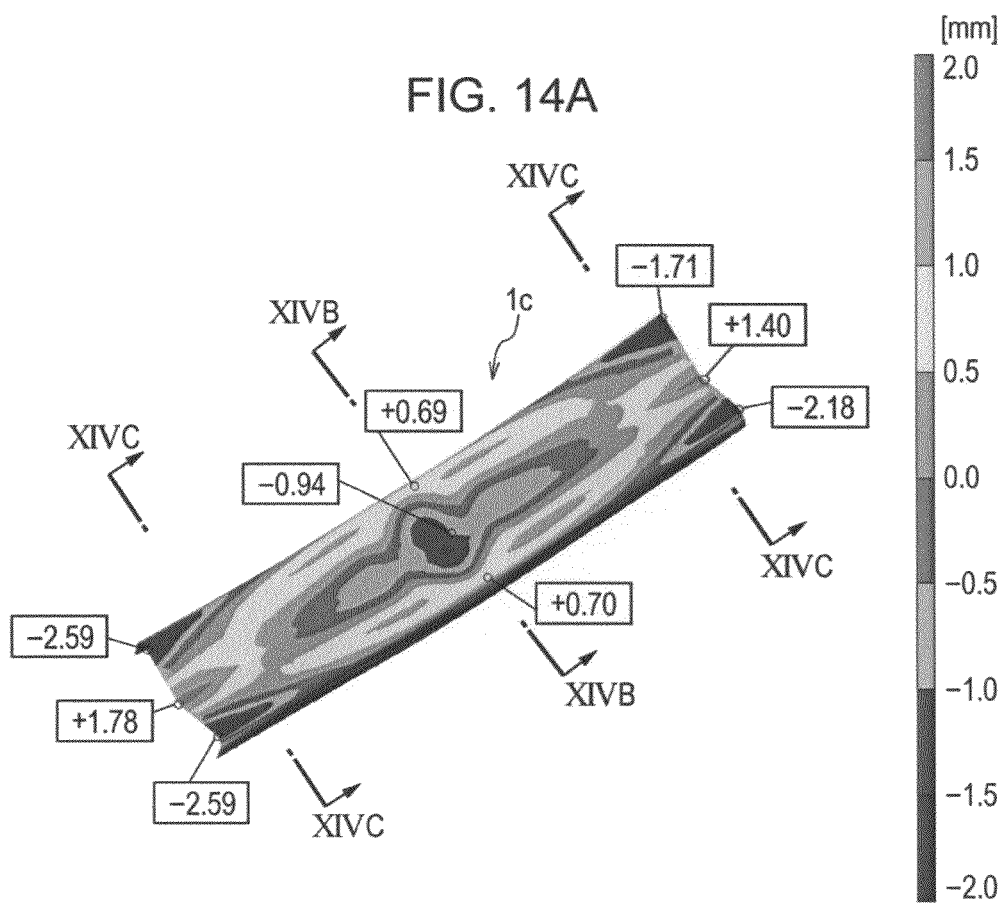
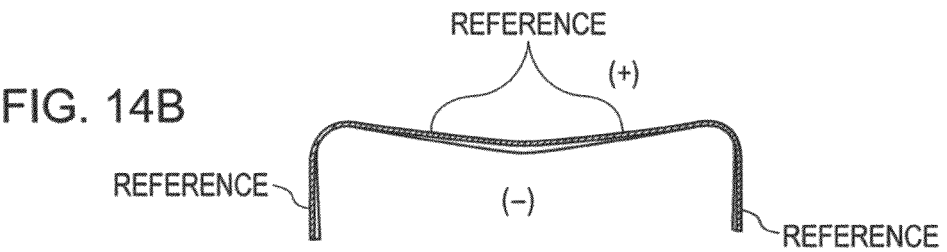
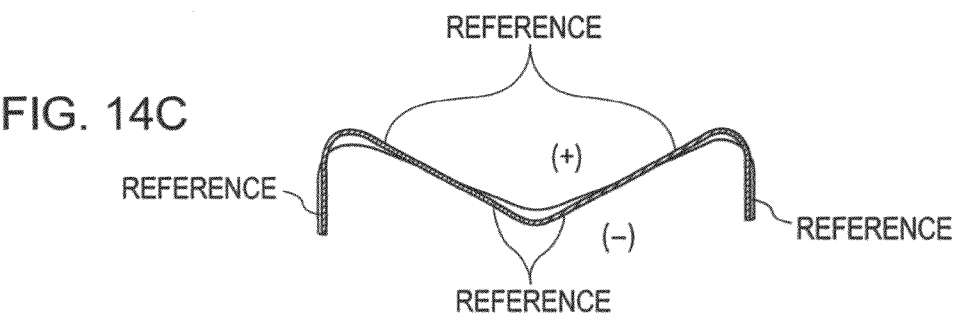

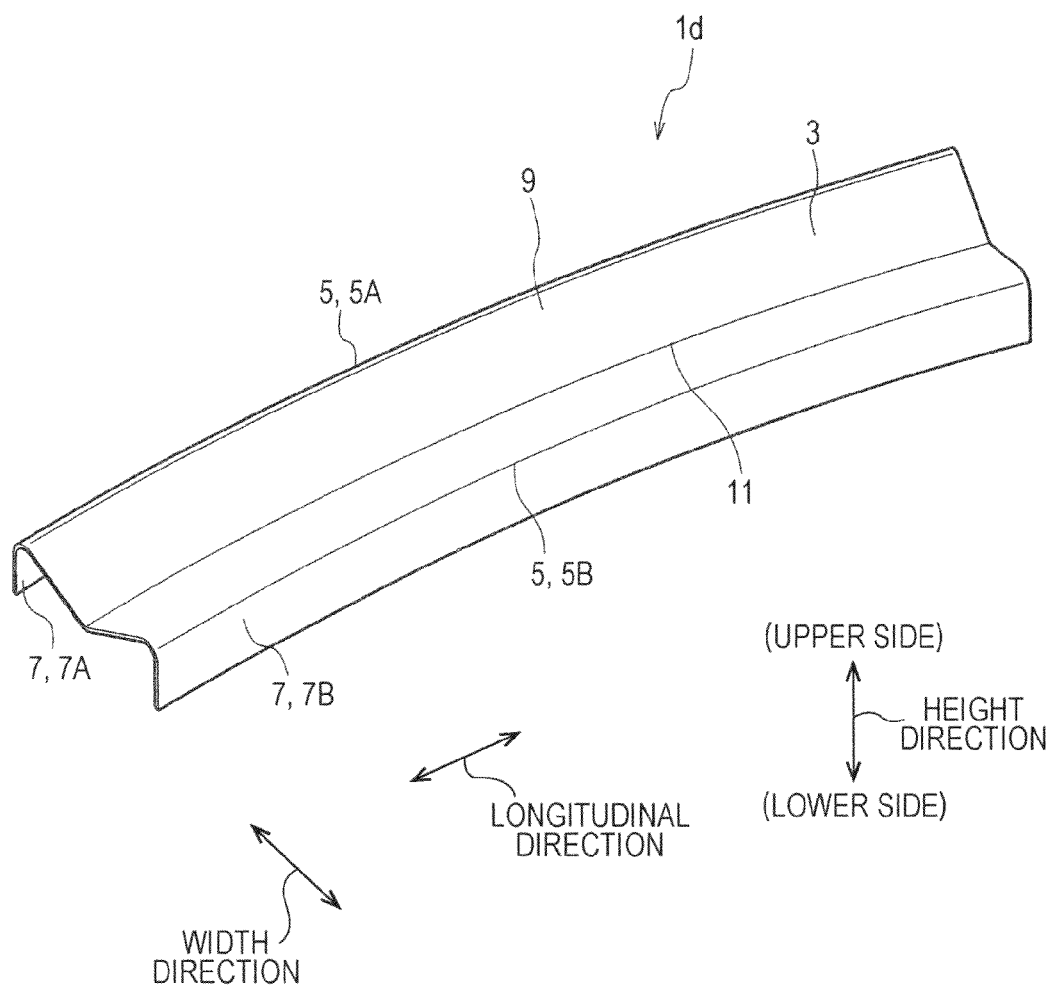

PRESS-FORMED PRODUCT

CROSS-REFERENCE TO RELATED APPLICATIONS

The present application claims priority from Japanese Patent Application No. 2012-075548 filed on Mar. 29, 2012, the entirety of which is hereby incorporated by reference into this application.

BACKGROUND OF THE INVENTION

1. Field of the Invention

The present invention relates to a press-formed product, and in particular, to a press-formed product including a top panel portion and a side panel portion.

2. Description of the Related Art

There are known press-formed products (press products), such as roof side rail reinforcements, that have a substantially hat-shaped cross-section or a substantially U-shaped cross sectional shape in the longitudinal direction and in which a side wall portion (side panel portion) of the cross section is curved (a bent portion is curved) in the longitudinal direction.

In some existing press-formed products, a side wall portion includes a length difference absorbing portion that is bent or curved in the thickness direction of the side wall portion so as to prevent or suppress torsion of the press-formed products due to occurrence of a stress difference caused by a length difference or the like (see, for example, Japanese Unexamined Patent Application Publication No. 2009-73420).

Springback and torsion due to springback usually occur in curved press-formed products.

That is, in a press-formed product 300 illustrated in FIGS. 18 to 19C, whose cross section (taken along a plane perpendicular to the longitudinal direction) is U-shaped and whose bent portion is curved, springback occurs as illustrated in FIGS. 20A to 20C. As a result, large torsion occurs in the press-formed product 300.

The term "REFERENCE" in FIGS. 20B and 20C refers to the target shape of the press-formed product (when manufacturing the press-formed product). The symbol "+" shows that springback is oriented outward from the cross section, and the symbol "−" shows that springback is oriented inward of the cross section (the same applies to FIGS. 3B, 3C, 11B, 11C, 14B, 14C, 17B, and 17C).

Occurrence of torsion can be prevented or suppressed by providing a side wall portion with a length difference absorbing portion that is bent or curved in the thickness direction of the side wall portion as in the related-art example described above. In this case, however, a problem arises in that the strength of the press-formed product is reduced because a bending line of the length difference absorbing portion becomes the origin of deformation of the press-formed product.

For example, as illustrated in FIGS. b 3 and 8 of Japanese Unexamined Patent Application Publication No. 2009-73420, the press-formed product includes bent portions (steps) 44 and 46. If a pressing load is applied to the press-formed product in the horizontal direction of FIG. 3 of Japanese Unexamined Patent Application Publication No. 2009-73420 (in the vertical direction of FIG. 8 of Japanese Unexamined Patent Application Publication No. 2009-73420), a bending moment is generated at the steps 44 and 46, and the strength of the press-formed product is reduced.

SUMMARY OF THE INVENTION

Accordingly, it is an object of the present invention to provide a press-formed product whose bent portion is curved and that can suppress or prevent occurrence of springback after being press-formed and can suppress or prevent occurrence of torsion.

According to an aspect of the invention, a press-formed product includes a top panel portion, and a side panel portion connected to the top panel portion through a bent portion that is curved so as to have an arc shape. The top panel portion includes a recessed portion that is curved so as to have an arc shape in a direction opposite to a direction in which the bent portion is curved.

In the press-formed product, the side panel portion may include a first side panel portion and a second side panel portion, the bent portion may include a first bent portion formed on one side of the top panel portion and a second bent portion formed on the other side of the top panel portion, the first side panel portion may be connected to the top panel portion through the first bent portion, the second side panel portion may be connected to the top panel portion through the second bent portion, and the second side panel portion may protrude toward the same side that the first side panel portion does. The recessed portion may be formed between the first and second bent portions, and a bottom portion of the recessed portion may have a curvilinear shape that is curved in a direction opposite to a direction in which the first and second bent portions are curved.

In the press-formed product, the first bent portion and the second bent portion may be each curved so as to have an arc shape in plan view, and a center of an arc of the bottom portion of the recessed portion and centers of arcs of the first and second bent portions may be located opposite each other with the top panel portion therebetween in plan view.

In the press-formed product, the first bent portion and the second bent portion may be each curved so as to have an arc shape in side view, and a center of an arc of the bottom portion of the recessed portion and centers of arcs of the first and second bent portions may be located opposite each other with the top panel portion therebetween in side view.

In the press-formed product, the number of side panel portions may be one, the number of bent portions may be one, the side panel portion may be disposed on one side of the top panel portion and connected to the top panel portion through the bent portion, and a bottom portion of the recessed portion may have a curvilinear shape that is curved in a direction opposite to a direction in which the bent portion is curved.

According to a second aspect of the invention, a press-formed product includes a top panel portion, a first side panel portion connected to the top panel portion through a first bent portion that is curved so as to have an arc shape and that is formed on one side of the top panel portion, a second side panel portion connected to the top panel portion through a second bent portion that is curved so as to have an arc shape and that is formed on the other side of the top panel portion. The top panel portion includes a recessed portion that is curved so as to have an arc shape. The second side panel portion protrudes toward the same side that the first side panel portion does. The recessed portion is formed between the first and second bent portions.

The present invention has an advantage in that a press-formed product can be provided whose bent portion is curved and that can suppress or prevent occurrence of springback after being press-formed and can suppress or prevent occurrence of torsion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a perspective view of a press-formed product according to a first embodiment of the present invention;

FIGS. 6A to 6F, which correspond to FIGS. 2B, 2C, and 5C, are cross sectional views of press-formed products according to modifications (taken along a plane perpendicular to the longitudinal direction);

FIG. 7 is a perspective view of a press-formed product according to a second embodiment of the present invention;

FIG. 10A is a side view of the press-formed product according to the third embodiment of the present invention, FIG. 10B is a sectional view taken along line XB-XB of FIG. 10A, and FIG. 10C is a sectional view taken along line XC-XC of FIG. 10A;

FIG. 12 is a perspective view of a press-formed product according to a fourth embodiment of the present invention;

FIG. 14A is a perspective views illustrating the amount of springback of the press-formed product according to the fourth embodiment of the present invention, FIG. 14B is a sectional view taken along line XIVB-XIVB of FIG. 14A, and FIG. 14C is a sectional view taken along line XIVC-XIVC of FIG. 14A;

FIG. 15 is a perspective view of a press-formed product according to a fifth embodiment of the present invention;

DESCRIPTION

Press-formed products (press products) according to embodiments of the present invention are used, for example, as vehicle body parts such as roof side rail reinforcements.

First Embodiment

Figure 2A:
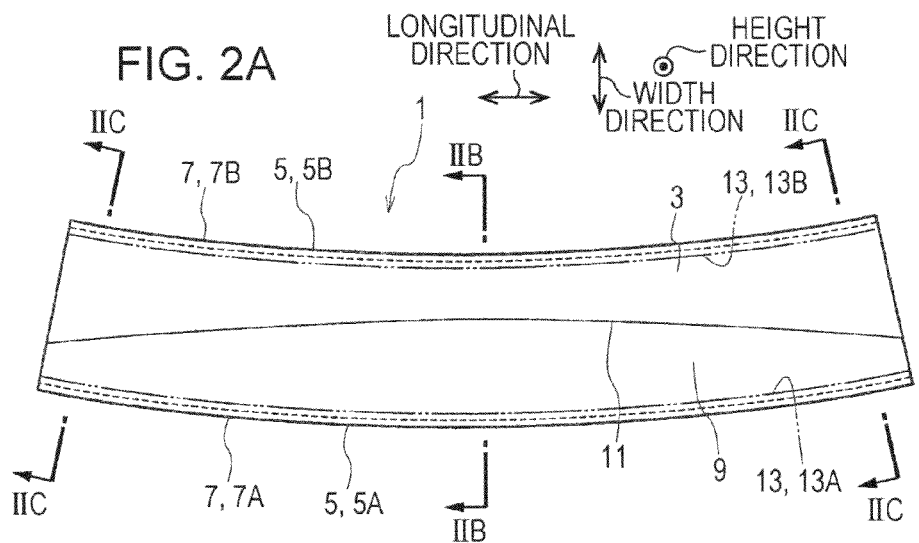
FIG. 2A is a plan view of the press-formed product according to the first embodiment of the present invention.
Figure 2B:
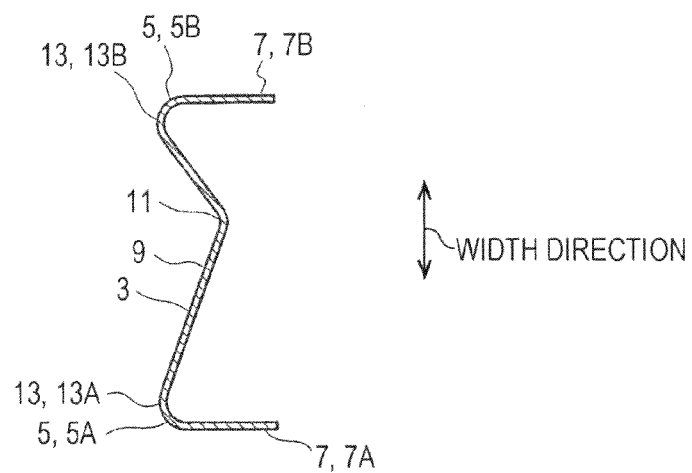
FIG. 2B is a sectional view taken along line IIB-IIB of FIG. 2A.
Figure 2C:
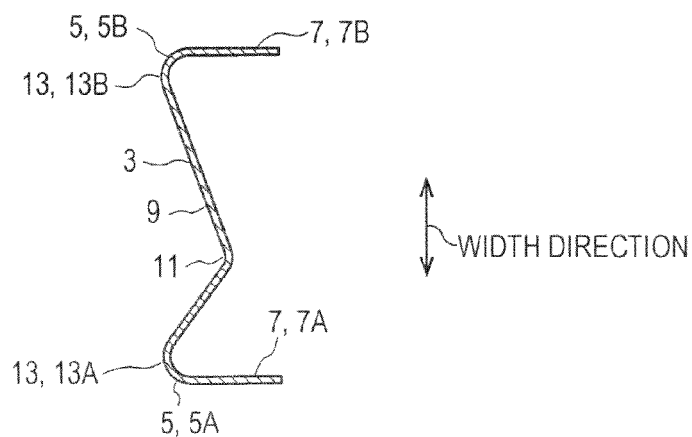
FIG. 2C is a sectional view taken along line IIC-IIC of FIG. 2A.

As illustrated in FIGS. 1 to 2C, a press-formed product 1 according to a first embodiment of the present invention includes a top panel portion 3 and side panel portions 7. The side panel portions 7 are connected to the top panel portion 3 through bent portions 5, each of which is curved so as to have an arc shape.

The press-formed product 1 is made by, for example, press-forming a flat plate-like material (a metal material such as a high-tensile steel sheet) by using a die and the like. Thus, the top panel portion 3 and the side panel portions 7 are integrally formed. The top panel portion 3 and each of the side panel portions 7 are disposed opposite each other with a corresponding one of the bent portions 5 therebetween.

For convenience of description, a direction along the length of the press-formed product 1 may be referred to as the "longitudinal direction", a direction perpendicular to the longitudinal direction may be referred to as the "width direction" of the press-formed product 1, and the direction perpendicular to the width direction and the longitudinal direction may be referred to as the "height direction" (vertical direction) of the press-formed product 1.

The bent portions 5 extend, for example, in the longitudinal direction of the flat plate-like material (the longitudinal direction of the press-formed product 1). However, because the bent portions 5 are curved, the directions in which the bent portions 5 extend are not completely the same as the longitudinal direction of the press-formed product 1. Due to the presence of the bent portions 5, the press-formed product 1 has a three-dimensional shape instead of a two-dimensional shape.

The top panel portion 3 includes a recessed portion 9. The recessed portion 9 is curved so as to have an arc shape in a direction opposite to a direction in which the bent portions 5 are curved, and extends in the longitudinal direction of the flat plate-like material (the longitudinal direction of the press-formed product 1). As with the case of the bent portions 5, because the recessed portion 9 is also curved, the direction in which the recessed portion 9 extends is not completely the same as the longitudinal direction of the press-formed product 1.

The side panel portions 7 protrude from the top panel portion 3 downward in the height direction of the press-formed product 1 by a predetermined amount. The recessed portion 9 is a part of the top panel portion 3 that protrudes toward the same side that the side panel portions 7 do.

In the press-formed product 1, the radius of curvature of an arc of each of the bent portions 5 is constant. However, the radius of curvature need not be constant and may vary in a direction in which the arc extends. For example, the radius of curvature of both end portions of the arc of each of the bent portions 5 may be larger than or smaller than that of a central portion of the arc in which the arc extends.

Likewise, although the radius of curvature of an arc of the recessed portion 9 of the press-formed product 1 is constant, it is not necessary that the radius of curvature be constant.

In the press-formed product 1, a pair of the side panel portions 7 are provided. One of the side panel portions 7 (a first side panel portion 7A) is connected to the top panel portion 3 through one of the bent portions 5 (a first bent portion 5A), which is formed on one side of the top panel portion 3 in the width direction.

The other of the side panel portions 7 (a second side panel portion 7B) is connected to the top panel portion 3 through the other of the bent portions 5 (a second bent portion 5B), which is formed on the other side of the top panel portion 3 in the width direction. The second side panel portion 7B protrudes from the top panel portion 3 toward the same side that the first side panel portion 7A does. The second side panel portion 7B may protrude toward a side opposite to the side toward which the first side panel portion 7A protrudes.

The bent portions 5A and 5B are separated from each other and extend substantially parallel to each other.

The recessed portion 9 is formed between the bent portions 5A and 5B, and a bottom portion 11 of the recessed portion 9 has a curvilinear shape. The bending line of the bottom portion 11 of the recessed portion 9 is curved so as to have an arc shape in a direction opposite to the direction in which the bent portions 5A and 5B are curved (see FIG. 2A).

A cross section of the press-formed product 1 taken along a plane perpendicular to the longitudinal direction of the press-formed product 1 (the direction in which the bent portions 5 extend) is generally M-shaped (see FIGS. 2B and 2C).

In the press-formed product 1, a bending line 13A of the first bent portion 5A and a bending line 13B of the second bent portion 5B generally lie in the same plane.

Here, the bending lines 13A and 13B of the bent portions 5A and 5B are, for example, the ridge lines of the bent portions 5 of FIGS. 2B and 2C (shown as the vertices of rounded portions; in FIG. 2A, the arc-shaped ridge lines of the bent portions 5A and 5B).

The bending lines 13 (13A and 13B) of the bent portions 5 (5A and 5B) generally lie in the same plane. In some embodiments, when the press-formed product 1 is placed on a horizontal flat surface (an upper surface of a surface plate) so that the top panel portion 3 is positioned below the side panel portions 7 (7A and 7B), the entireties of the ridge lines (two arc-shaped ridge lines) 13 (13A and 13B) of the bent portions 5 (5A and 5B) are in contact with the upper surface of the surface plate.

As can be seen from FIG. 2A, when seen in a direction (the height direction of the press-formed product 1) perpendicular to the aforementioned plane (an upper surface of a surface plate) (in plan view), the center of the arc of the first bent portion 5A (the bending line 13A) and the center of the arc of the second bent portion 5B (the bending line 13B) are the same as each other. The center of the arc of the first bent portion 5A and the center of the arc of the second bent portion 5B are located in the aforementioned plane.

In plan view, the radius (the radius of curvature) of the arc of the first bent portion 5A is larger than the radius (the radius of curvature) of the second bent portion 5B.

In plan view, one end of the arc of the first bent portion 5A, one end of the arc of the second bent portion 5B, and the centers of the arcs of the bent portions 5 (5A and 5B) are arranged in a straight line. In plan view, the other end of the arc of the first bent portion 5A, the other end of the arc of the second bent portion 5B, and the centers of the arcs of the bent portions 5 (5A and 5B) are arranged in another straight line.

However, the description above is not a limitation, and it is only necessary that the first bent portion 5A and the second bent portion 5B be curved so as to have arc shapes in plan view.

That is, it is only necessary that the press-formed product 1 be configured such that the first and second bent portions 5A and 5B be curved so as to have arc shapes in plan view, and the center of the arc of the bottom portion 11 of the recessed portion 9 and the centers of the arcs of the bent portions 5A and 5B be located opposite each other with the top panel portion 3 therebetween in plan view. The first bent portion 5A, the second bent portion 5B, and the recessed portion 9 may be partially curved.

In plan view, the top panel portion 3 has a substantially sectoral shape. That is, the top panel portion 3 has a shape that is traced by a line segment drawn on a plane when the line segment is rotated by a predetermined angle (such as 30°) around a point that is on an extension of the line segment and at a predetermined distance from the line segment.

In plan view, the center of the arc of the bottom portion 11 of the recessed portion 9 and the centers of the arcs of the bent portions 5 (5A and 5B) are located opposite each other with the top panel portion 3 therebetween. That is, the centers of the arcs of the bent portions 5 (5A and 5B) are located above and away from the press-formed product 1 illustrated in FIG. 2A, and the center of the arc of the bottom portion 11 of the recessed portion 9 is located below and away from the press-formed product 1 illustrated in FIG. 2A. In the longitudinal direction of the press-formed product 1, the positions of the centers of the arcs of the bent portions 5 (5A and 5B) and the position of the center of the arc of the bottom portion 11 of the recessed portion 9 are the same as the position of the center of the press-formed product 1.

The radius of curvature of the arc of the bottom portion 11 of the recessed portion 9 is larger than the radius of curvature of the arc of the first bent portion 5A and the radius of curvature of the arc of the second bent portion 5B. However, the radius of curvature of the arc of the bottom portion 11 may be smaller than or equal to the radius of curvature of the arc of each of the first and second bent portions 5A and 5B.

The press-formed product 1 will be described in more detail. The cross sectional shape of the top panel portion 3 of the press-formed product 1 (the shape of a cross section taken along a plane perpendicular to the longitudinal direction of the press-formed product 1 and the top panel portion 3) is V-shaped. However, the bottom portion 11, which is V-shaped, is not located at a fixed position in the width direction of the press-formed product 1, and the position of the bottom portion 11 varies to some extent in the longitudinal direction of the press-formed product 1 (see FIGS. 2B and 2C and other figures).

For example, at both end portions of the press-formed product 1 in the longitudinal direction (the left and right end portions of the press-formed product 1 in FIG. 2A), the V-shaped bottom (bottom portion) 11 is located at a position nearer to the first bent portion 5A in the width direction of the press-formed product 1 (in a lower part in the vertical direction in FIG. 2A). In a middle portion of the press-formed product 1 in the longitudinal direction, the V-shaped bottom (bottom portion) 11 is located at a position nearer to the second bent portion 5B in the width direction of the press-formed product 1 (in an upper part of FIG. 2A).

The depth of the V-shaped bottom (bottom portion) 11 (the distance between each of the bent portions 5 and the V-shaped bottom portion 11 in the height direction of the press-formed product 1) is substantially constant.

The side panel portions 7 (7A and 7B) stand on the top panel portion 3 in the height direction of the press-formed product 1. Thus, in plan view of the press-formed product 1, not only the top panel portion 3 but also the entirety of the press-formed product 1 including the side panel portions 7 has a substantially sectoral shape as described above (see FIG. 2A).

The height dimensions of the side panel portions 7 (7A and 7B) are substantially constant along the longitudinal dimension. Thus, although not illustrated, the press-formed product 1 has an elongated rectangular shape when seen in the width direction.

Figure 3A:
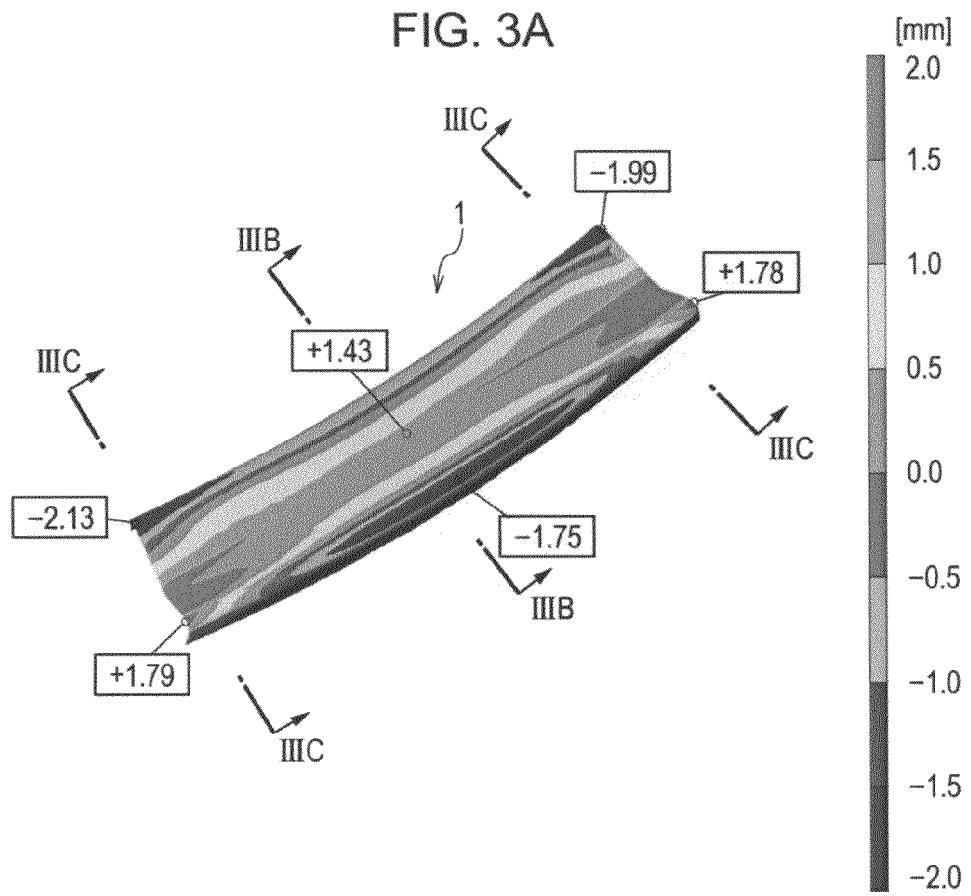
FIG. 3A is a perspective views illustrating the amount of springback of the press-formed product according to the first embodiment of the present invention.
Figure 3B:
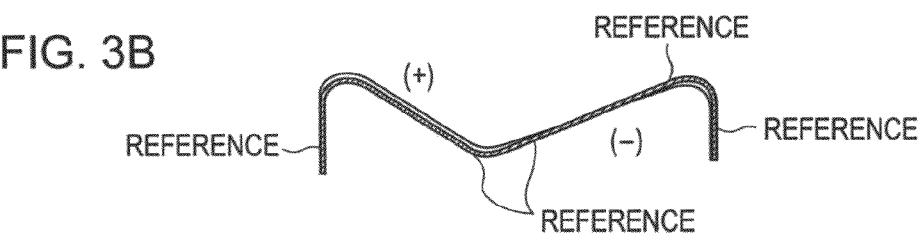
FIG. 3B is a sectional view taken along line IIIB-IIIB of FIG. 3A.
Figure 3C:
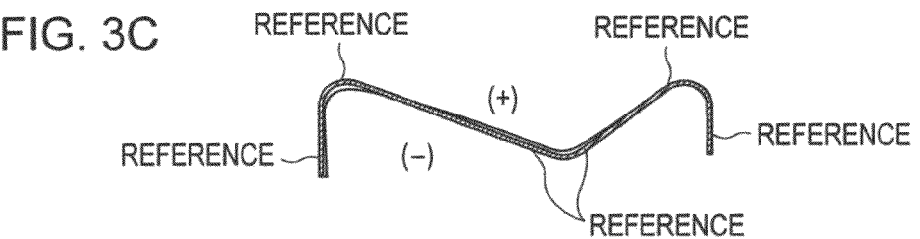
FIG. 3C is a sectional view taken along line IIIC-IIIC of FIG. 3A.
Figure 20A:
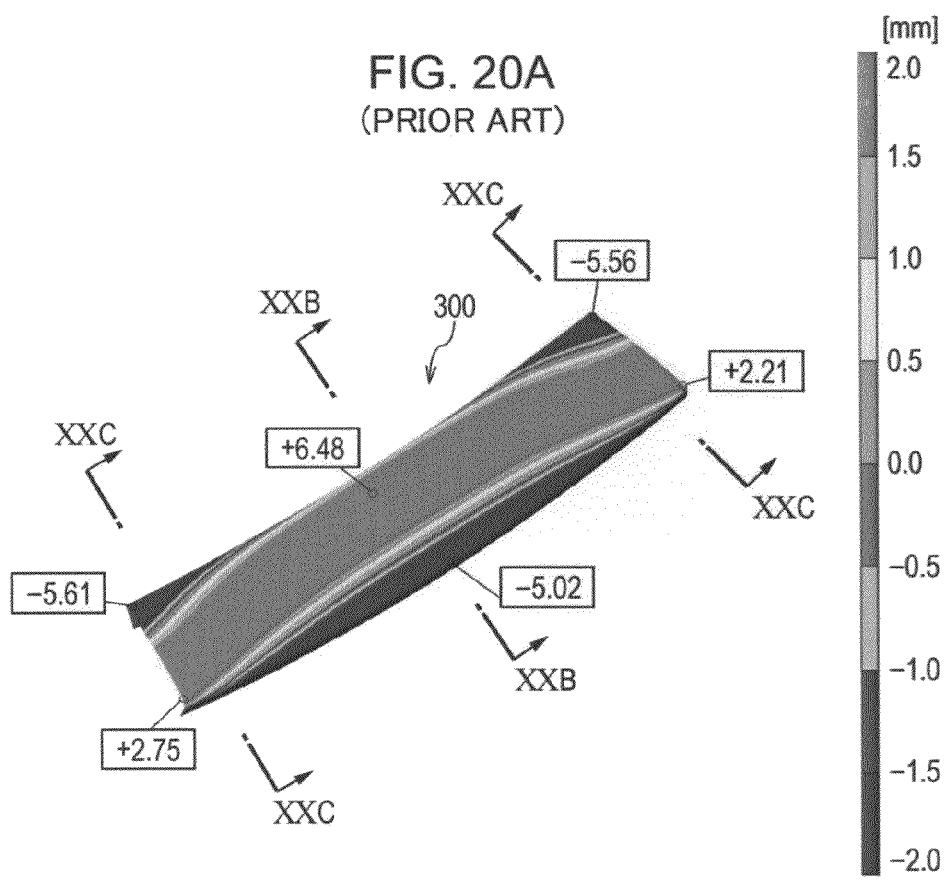
FIG. 20A is a perspective views illustrating the amount of springback of the existing press-formed product.
Figure 20B:
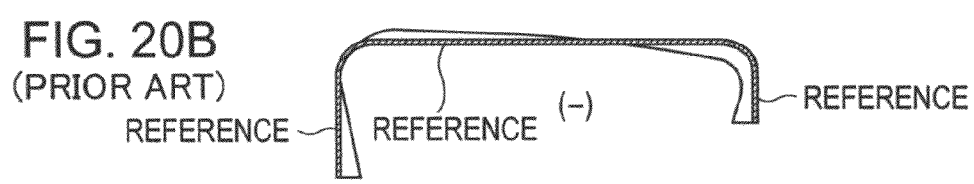
FIG. 20B is a sectional view taken along line XXB-XXB of FIG. 20A.
Figure 20C:
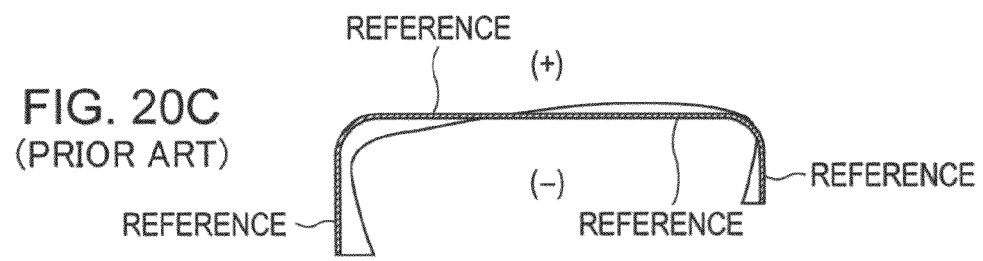
FIG. 20C is a sectional view taken along line XXC-XXC of FIG. 20A.

Here, a simulation result showing the amount of springback after the press-formed product 1 has been formed will be described. As can be seen from FIG. 3A, the amount of springback of the press-formed product 1 is smaller than that of the existing press-formed product 300 illustrated in FIG. 20A.

For example, the maximum springback amount of the existing press-formed product 300 is 6.48 mm, while the maximum springback amount of the press-formed product 1 is 2.13 mm.

In the press-formed product 1, the top panel portion 3 includes the recessed portion 9, which is curved so as to have an arc shape in a direction opposite to a direction in which the bent portions 5 are curved. Therefore, residual stress generated in the press-formed product 1 due to press-forming is appropriately cancelled out (the internal stress can be appropriately balanced so that the amount of springback of the press-formed product 1 is reduced). Thus, in the press-formed product 1, occurrence of springback after being press-formed can be suppressed or prevented and occurrence of torsion can be suppressed or prevented.

With the press-formed product 1, it is not necessary to provide the side panel portions 7 with a length difference absorbing portion that is bent or curved in the thickness direction of the side panel portion 7 (a length difference absorbing portion described in Japanese Unexamined Patent Application Publication No. 2009-73420) or the like, and therefore the strength of the press-formed product 1 is not reduced.

The shape of the press-formed product 1 may be appropriately modified as illustrated in FIGS. 4A to 6F.

Modifications of the press-formed product 1 will be described in detail. In plan view, the press-formed product 1 described above has the shape illustrated in FIG. 4A. However, the recessed portion 9 (the bottom portion 11) may be linear as illustrated in FIG. 4B, or the recessed portion 9 (the bottom portion 11) may be curved in the same direction as the bent portions 5 are curved as illustrated in FIG. 4C. In these cases, the radius of curvature of the recessed portion 9 (the bottom portion 11) is larger than that of each of the bent portions 5.

Figure 5A:
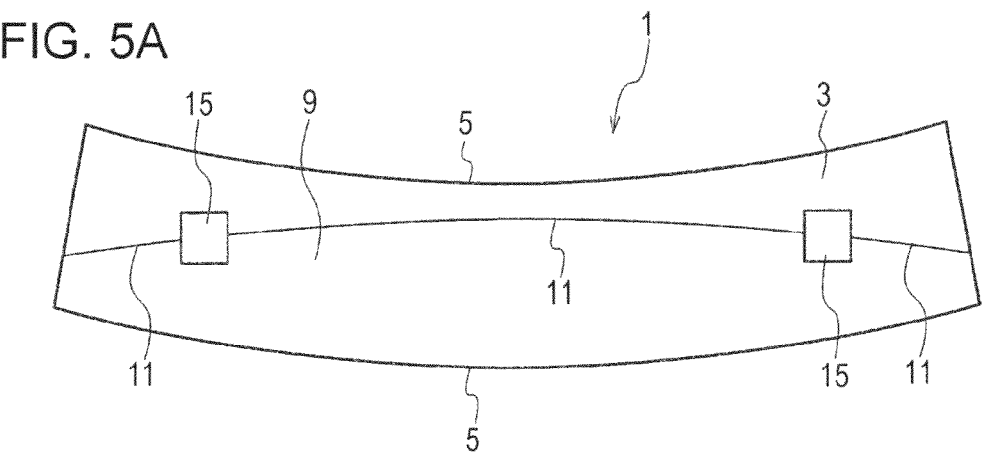
FIGS. 5A and 5B are plan views of press-formed products according to modifications, and FIG. 5C, which correspond to FIGS. 2B and 2C, is a cross sectional view of a press-formed product according to a modification (taken along a plane perpendicular to the longitudinal direction)

As illustrated in FIG. 5A, attachment portions (attachment portions used to attach the press-formed product 1 to another structure or the like) 15 may be formed in the recessed portion 9 (the bottom portion 11). In addition to or instead of the attachment portions 15, through-holes or the like may be formed in the recessed portion 9. By forming the attachment portions 15 or the like, the recessed portion 9 (the bottom portion 11) is divided at the positions at which the attachment portions 15 or the like are formed. The attachment portions 15 or the like may be disposed either at positions in the recessed portion 9 (the bottom portion 11) or at positions outside of the recessed portion 9 (at appropriate positions in the top panel portion 3 or the side panel portions 7).

Figure 5B:
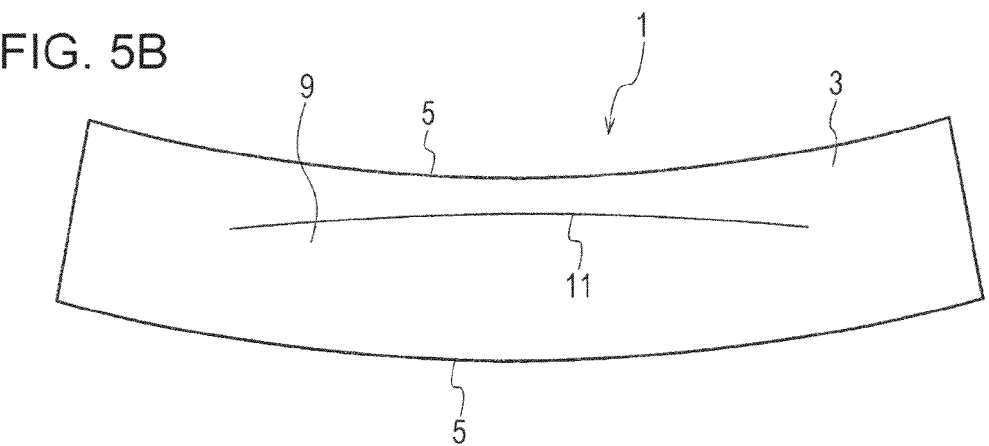

As illustrated in FIG. 5B, the recessed portion 9 (the bottom portion 11) may be formed in only a part of the top panel portion 3 (for example, in only a middle portion in the longitudinal direction).

Figure 5C:
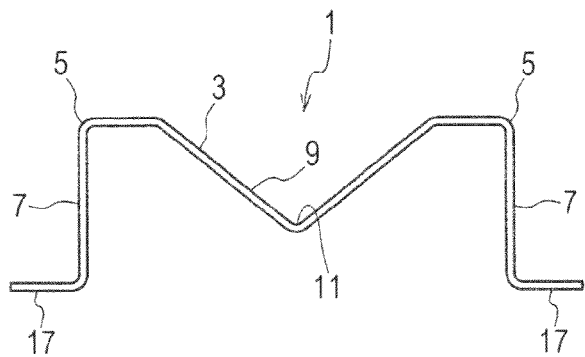

The press-formed product 1 may include a pair of flange portions 17, each having a plate-like shape (for example, a flat plate-like shape) and integrated with the press-formed product 1, and the cross sectional shape of the press-formed product 1 (the shape of a cross section taken along a plane perpendicular to the longitudinal direction of the press-formed product 1) may be as illustrated in FIG. 5C. Each of the flange portions 17 protrudes from an end of a corresponding one of the side panel portions 7 in the width direction of the press-formed product 1. The thickness direction of the flange portions 17 is the same as the height direction of the press-formed product 1. One of the flange portions 17 may be omitted.

The cross sectional shape of the press-formed product 1 (the shape of a cross section of the press-formed product 1 taken along a plane perpendicular to the longitudinal direction of the press-formed product 1) may be appropriately modified as illustrated in FIGS. 6A to 6F.

FIG. 6A is a cross sectional view of the press-formed product 1 illustrated in FIGS. 1 to 2C. In the press-formed product 1 of FIG. 6A, the top panel portion 3 includes flat portions 19. The flat portions 19 are formed in the top panel portion 3 at positions adjacent to the side panel portions 7, and the recessed portion 9 is not formed in the flat portions 19. The thickness direction of the flat portions 19 is the same as the height direction of the press-formed product 1.

FIG. 6B illustrates a modification of the press-formed product 1, which is different from that of FIG. 6A in that the flat portions 19 are omitted. Therefore, substantially the entirety of the recessed portion 9 is substantially the entirety of the top panel portion 3.

Note that the press-formed product 1 illustrated in FIGS. 1 to 2C includes the flat portions 19. However, the press-formed product 1 illustrated in FIGS. 1 to 2C looks like the modification illustrated in FIG. 6B, because the flat portions 19 are very small.

FIG. 6C illustrates a modification of the press-formed product 1, which differs from that of FIG. 6A in that the recessed portion 9 is arc-shaped (for example, semicircular). FIG. 6D illustrates a modification of the press-formed product 1, which differs from that of FIG. 6A in that the recessed portion 9 is U-shaped. FIG. 6E illustrates a modification of the press-formed product 1, which differs from that of FIG. 6A in that the recessed portion 9 is trapezoidal (for example, isosceles trapezoidal). FIG. 6F illustrates a modification of the press-formed product 1, which differs from that of FIG. 6A in that the side panel portions 7 protrude diagonally from the top panel portion 3. The distance between the side panel portions 7 (7A and 7B) increases with increasing distance from the top panel portion 3.

Second Embodiment

Figure 8A:
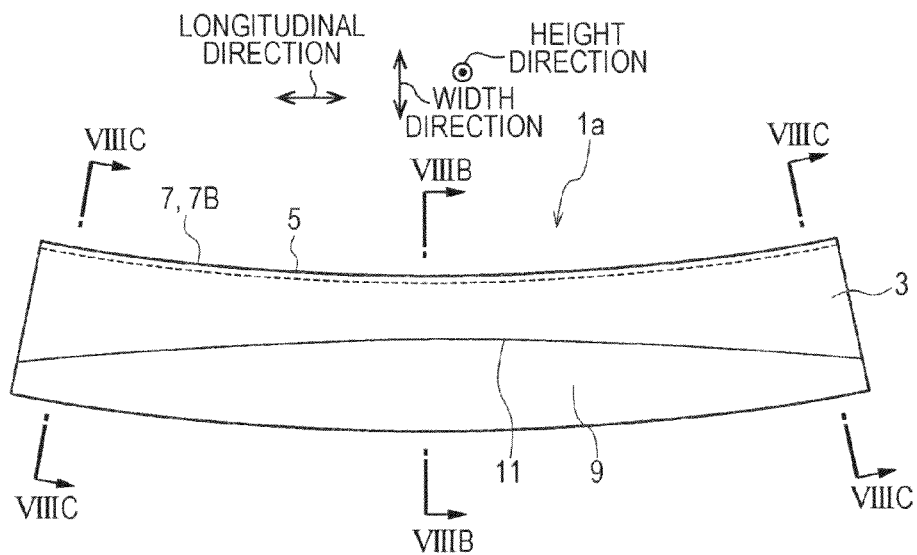
FIG. 8A is a plan view of the press-formed product according to the second embodiment of the present invention.
Figure 8B:
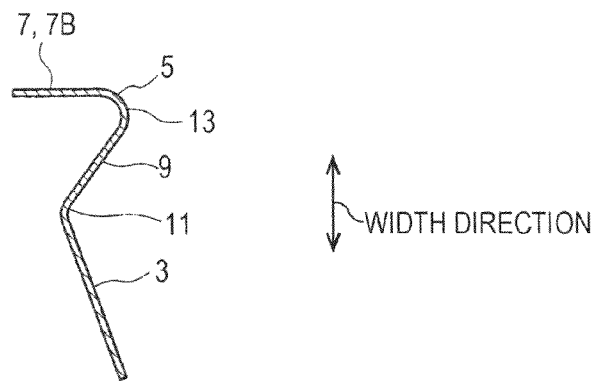
FIG. 8B is a sectional view taken along line VIIIB-VIIIB of FIG. 8A.
Figure 8C:
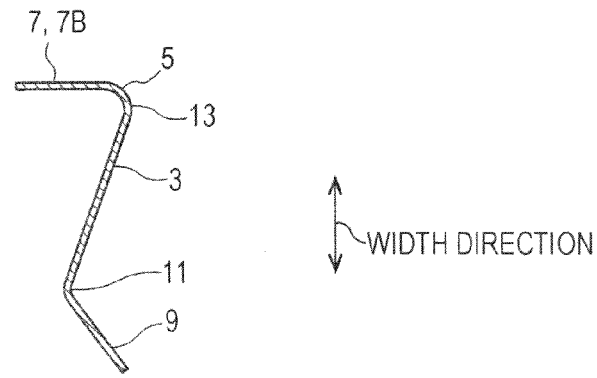
FIG. 8C is a sectional view taken along line VIIIC-VIIIC of FIG. 8A.

FIGS. 7 to 8C illustrate a press-formed product 1*a* according to a second embodiment, which differs from the press-formed product 1 according to the first embodiment in that the first side panel portion 7A and the first bent portion 5A are omitted. In other respects, the press-formed product 1*a* has the same structure and substantially the same advantage as the press-formed product 1 according to the first embodiment does. Where possible, the press-formed product 1a according to the second embodiment may be modified in the same way as in the case of the press-formed product 1 according to the first embodiment.

To be specific, the press-formed product 1a according to the second embodiment includes only one side panel portion 7 (7B) disposed on one side of the top panel portion 3, and the side panel portion 7 is connected to the top panel portion 3 through one bent portion 5.

Thus, a cross section of the press-formed product 1a taken along a plane perpendicular to the direction in which the bent portion 5 extends (the longitudinal direction of the press-formed product 1a) has a shape (substantially L-shape) formed by removing the first side panel portion 7A and the first bent portion 5A from the generally M-shaped press-formed product 1.

The bottom portion 11 of the recessed portion 9 has a curvilinear shape, and the bending line of the bottom portion 11 of the recessed portion 9 is curved in a direction opposite to a direction in which the bent portion 5 is curved.

The press-formed product 1a will be described further. As in the case of FIGS. 2B and 2C, the bending line 13 of the bent portion 5 is the ridge line of the bent portion 5.

When the press-formed product 1a is seen in the width direction, although not illustrated, the side panel portion 7 has an elongated rectangular shape, and the bent portion 5 has a linear shape. The bottom portion 11 of the recessed portion 9 also has a linear shape and extends parallel to the bent portion 5.

As illustrated in FIG. 8A, when seen in the height direction of the press-formed product 1a (in plan view), the top panel portion 3 has a substantially sectoral shape. The side panel portion 7 protrudes from the bent portion 5, which is formed on one side of the top panel portion 3 in the width direction, toward one side of the press-formed product 1a in the height direction (for example, downward, toward the back side of the plane of FIG. 8A).

In plan view, one end portion of the top panel portion 3 in the width direction (the bent portion 5; the side panel portion 7) has an arc shape, and the other end portion of the top panel portion 3 in the width direction also has an arc shape (whose radius of curvature is larger than that of the one end portion). The centers of the arcs of both end portions of the top panel portion 3 are the same as each other.

As can be seen from FIG. 8A, in plan view, the centers of the arcs of both end portions of the top panel portion 3 in the width direction are located above and away from the top panel portion 3.

In plan view, the bottom portion 11 of the recessed portion 9 has an arc shape (whose radius of curvature is larger than those of both end portions of the top panel portion 3 in the width direction), and the center of the arc of the bottom portion 11 of the recessed portion 9 and the centers of the arcs of both end portions of the top panel portion 3 are located opposite each other with the top panel portion 3 therebetween (in FIG. 8A, the center of the arc of the bottom portion 11 is located below the press-formed product 1a).

The depth of the recessed portion 9 (the distance between the bottom portion 11 of the recessed portion 9 and the bent portion 5 in the height direction) is constant.

The distance between the bottom portion 11 of the recessed portion 9 and the side panel portion 7 (the dimension of the press-formed product 1a in the width direction) is the largest at both ends of the press-formed product 1a in the longitudinal direction, gradually decreases toward the center of the press-formed product 1a in the longitudinal direction, and is the smallest at the center of the press-formed product 1a in the longitudinal direction (see FIG. 8A).

In the press-formed product 1a, the side panel portion 7 (the bent portion 5) may be disposed on the opposite side. That is, the press-formed product 1a according to the second embodiment may differ from the press-formed product 1 according to the first embodiment in that the second side panel portion 7B and the second bent portion 5B are omitted.

Third Embodiment

Figure 9:
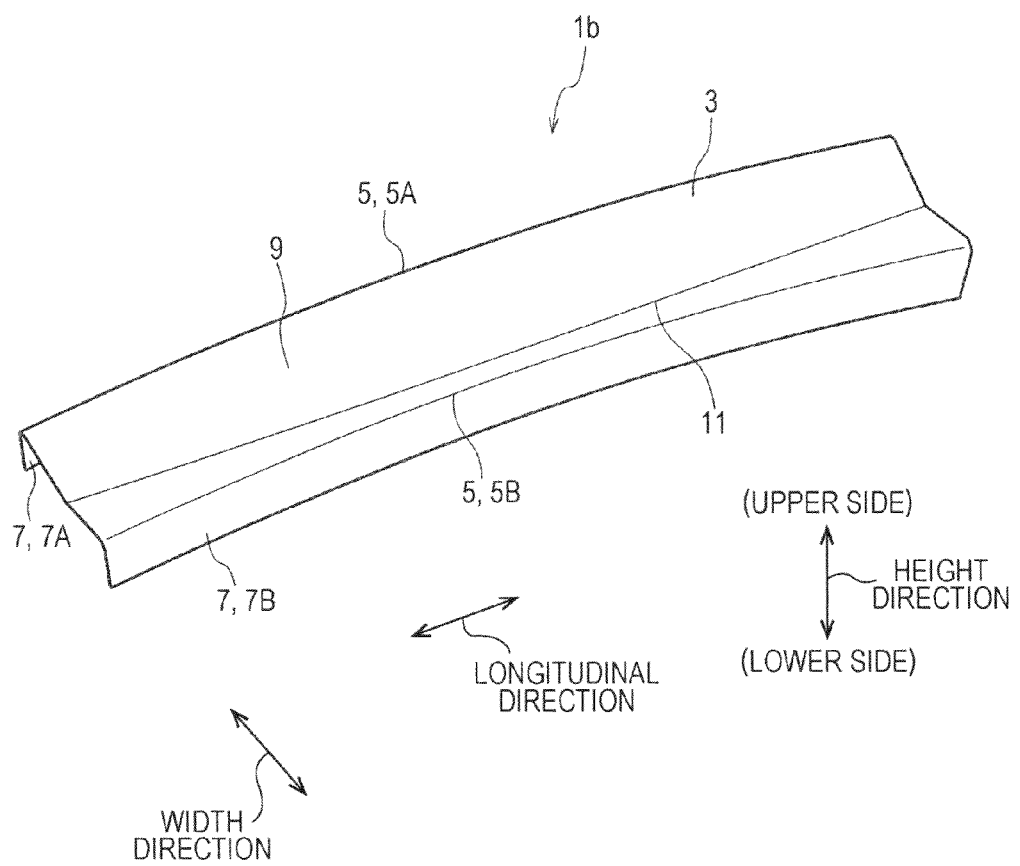
FIG. 9 is a perspective view of a press-formed product according to a third embodiment of the present invention.

FIGS. 9 to 10C illustrate a press-formed product 1b according to a third embodiment, which differs from the press-formed product 1 according to the first embodiment in the manner in which the bent portions 5 and the like are curved. In other respects, the press-formed product 1b has the same structure and substantially the same advantage as the press-formed product 1 according to the first embodiment does. The press-formed product, 1b according to the third embodiment may be modified in the same way as in the case of the press-formed product 1 according to the first embodiment.

In the press-formed product 1b according to the third embodiment, the bending line 13A of the first bent portion 5A lies in a plane that is parallel to the plane of FIG. 10A and that is located slightly away from the back side of the plane of FIG. 10A.

The bending line 13B of the second bent portion 5B is located at a position that is separated by a predetermined distance from the bending line 13A of the first bent portion 5A in a direction perpendicular to the aforementioned plane (in a direction perpendicular to the plane of the FIG. 10A) (in a plane that is parallel to the plane of FIG. 10A and located farther away from the back side of the plane of FIG. 10A).

To be more specific, the bending lines 13A and 13B of the bent portions 5A and 5B extend parallel to each other with a predetermined distance therebetween in the width direction of the press-formed product 1b. Moreover, as illustrated in FIG. 10A, when seen in the width direction of the press-formed product 1b, the bent portions 5A and 5B (the bending lines 13A and 13B) overlap each other.

However, the description above is not a limitation, and it is only necessary that each of the first and second bent portions 5A and 5B be curved so as to have an arc shape when seen in the width direction of the press-formed product 1b (in side view).

That is, it is only necessary that the press-formed product 1b be configured such that each of the first and second bent portions 5A and 5B is curved so as to have an arc shape in side view, and the center of the arc of the bottom portion 11 of the recessed portion 9 and the centers of the arcs of the bent portions 5A and 5B are located opposite each other with the top panel portion 3 therebetween in side view. The first bent portion 5A, the second bent portion 5B, and the recessed portion 9 may be partially curved.

As in the case of FIGS. 2B and 2C, the bending lines 13 of the bent portions 5 are the ridge lines of the bent portions 5.

As illustrated in FIG. 10A, when seen in a direction perpendicular to the aforementioned plane (in the width direction the press-formed product 1b) (in side view), the center of the arc of the bottom portion 11 of the recessed portion 9 and the centers of the arcs of the bent portions 5 are located opposite each other with the top panel portion 3 (the press-formed product 1b) therebetween.

When the press-formed product 1b is seen in the height direction (in plan view), although not illustrated, the top panel portion 3 has an elongated rectangular shape, and the bent portions 5A and 5B (the bending lines 13A and 13B) are each linear and extend parallel to each other. The bottom portion 11 of the recessed portion 9 is also linear, and extends parallel to the bent portions 5A and 5B so as to pass through a point (for example, the midpoint) between the bent portions 5A and 5B.

When the press-formed product 1b is seen in the width direction, as illustrated in FIG. 10A, the side panel portion 7 protrudes from the top panel portion 3 toward a side on which the centers of the arcs of the bent portions 5A and 5B (the bending lines 13A and 13B) are located (downward in FIG. 10A).

Each of the side panel portions 7A and 7B extends in the height direction and the longitudinal direction of the press-formed product 1b. That is, the thickness direction of each of the side panel portions 7A and 7B is the same as the width direction of the press-formed product 1b. Thus, when the press-formed product 1b is seen in the height direction, the press-formed product 1b also has an elongated rectangular shape. When the press-formed product 1b is seen in the width direction, as illustrated in FIG. 10A, the press-formed product 1b has a substantially sectoral shape, and the side panel portions 7A and 7B overlap each other.

When the press-formed product 1b is seen in the width direction, the center of the arc of the upper end portion of each side panel portion 7 (the bending line 13 of each bent portion 5) and the center of the arc of the lower end portion of the side panel portion 7 are located below the top panel portion 3 and are the same as each other, and the radius of curvature of the arc of the upper end portion of each side panel portion 7 is larger than the radius of curvature of the arc of the lower end portion of the side panel portion 7. The center of the arc of the bottom portion 11 of the recessed portion 9 is located above the top panel portion 3 (see FIG. 10A).

As illustrated in FIG. 10A, the depth of the recessed portion 9 (the distance between the bottom portion 11 of the recessed portion 9 and each of the bent portions 5 in the height direction) is the smallest at both ends of the press-formed product 1b in the longitudinal direction and gradually increases toward the center of the press-formed product 1b in the longitudinal direction. At the center of the press-formed product 1b in the longitudinal direction, for example, the depth of the recessed portion 9 is substantially the same as the height dimension of the side panel portions 7 (see FIG. 10B).

Figure 11A:
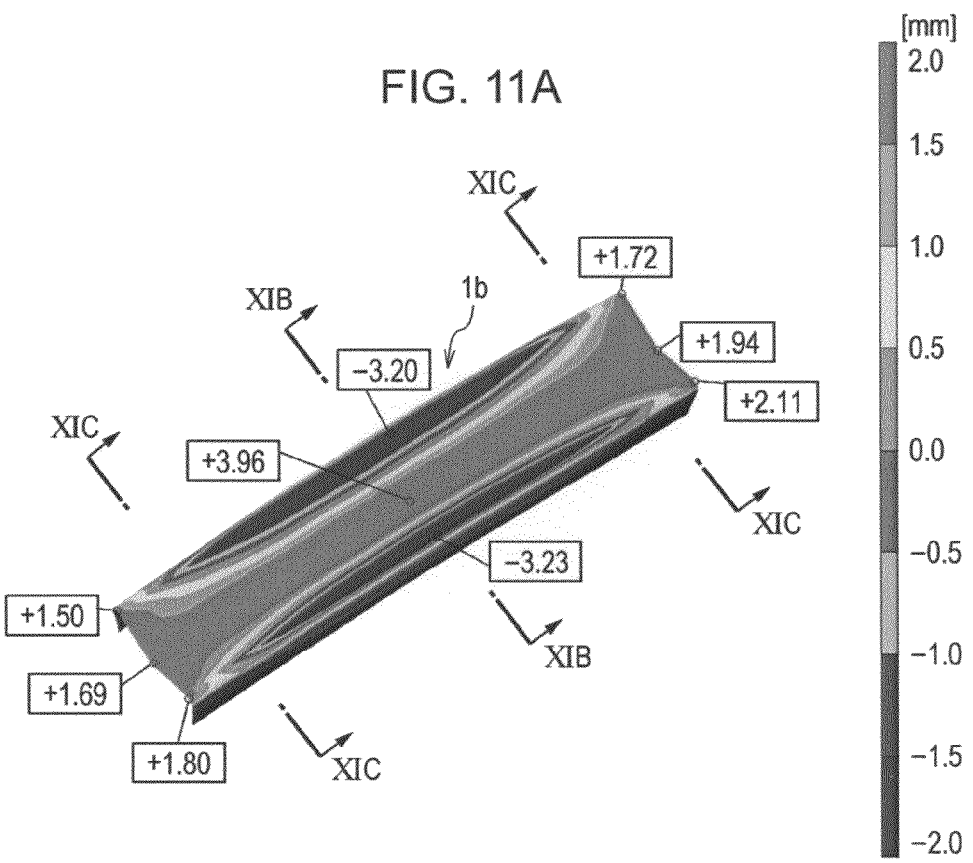
FIG. 11A is a perspective view illustrating the amount of springback of the press-formed product according to the third embodiment of the present invention.
Figure 11B:
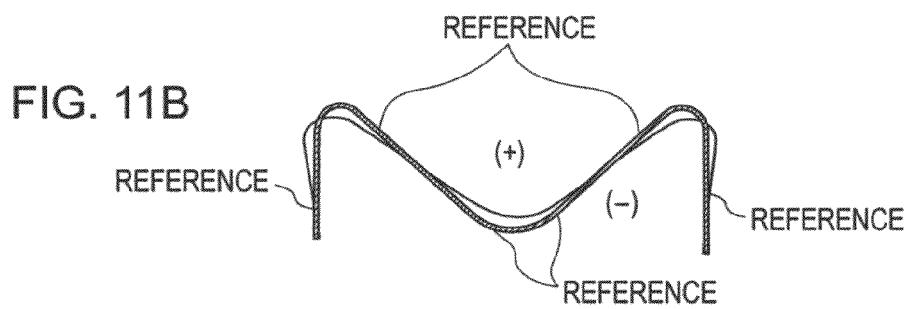
FIG. 11B is a sectional view taken along line XIB-XIB of FIG. 11A.
Figure 11C:
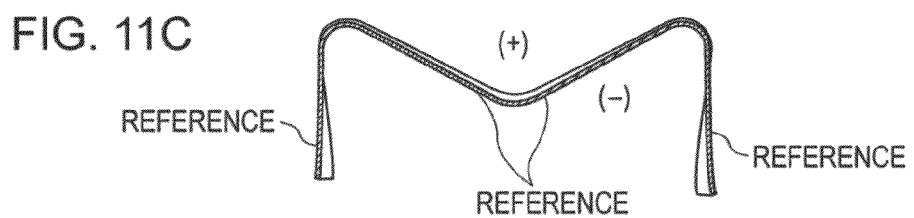
FIG. 11C is a sectional view taken along line XIC-XIC of FIG. 11A.

Here, a simulation result showing the amount of springback after the press-formed product 1b has been formed will be described. As can be seen from FIG. 11A, the amount of springback of the press-formed product 1b is smaller than that of the existing press-formed product 300 illustrated in FIG. 20A.

For example, the maximum springback amount of the existing press-formed product 300 is 6.48 mm, while the maximum springback amount of the press-formed product 1b is 3.96 mm.

Fourth Embodiment

Figure 13A:
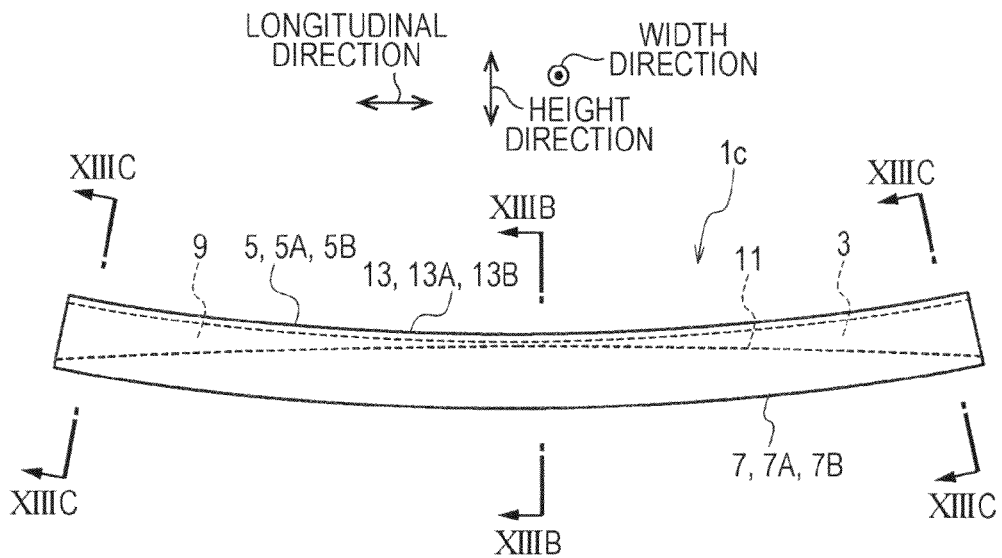
FIG. 13A is a side view of the press-formed product according to the fourth embodiment of the present invention.
Figure 13B:
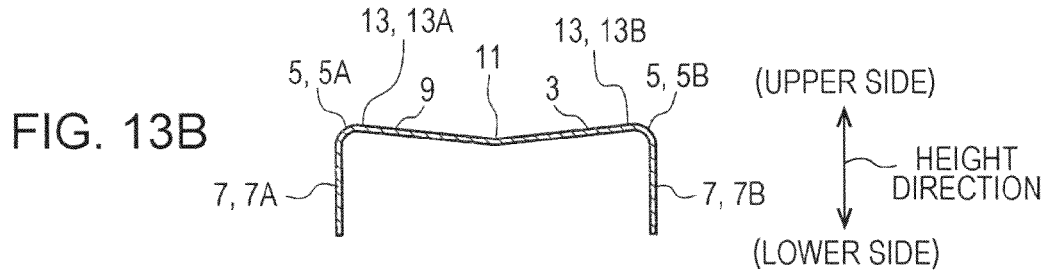
FIG. 13B is a sectional view taken along line XIIIB-XIIIB of FIG. 13A.
Figure 13C:
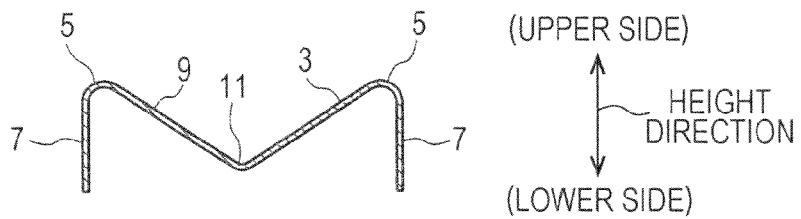
FIG. 13C is a sectional view taken along line XIIIC-XIIIC of FIG. 13A.

FIGS. 12 to 13C illustrate a press-formed product 1c according to a fourth embodiment, which differs from the press-formed product 1b according to the third embodiment in the manner in which the bent portions 5 and the like are curved. In other respects, the press-formed product 1c according to the fourth embodiment has the same structure and substantially the same advantage as the press-formed product 1b according to the third embodiment does. The press-formed product 1c according to the fourth embodiment may be modified in the same way as in the case of the press-formed product 1 according to the first embodiment.

The bent portions 5 and the recessed portion 9 of the press-formed product 1c according to the fourth embodiment are curved in a direction opposite to the direction in which the bent portions 5 and the recessed portion 9 of the press-formed product 1b according to the third embodiment are curved.

When the press-formed product 1c is seen in the height direction, although not illustrated, as with the press-formed product 1b of FIGS. 9 to 10C, the top panel portion 3 has an elongated rectangular shape, and the bent portions 5 are linear and extend parallel to each other. The bottom portion 11 of the recessed portion 9 is also linear and extends parallel to the bent portions 5 so as to pass through a point (for example, the midpoint) between the bent portions 5.

When the press-formed product 1c is seen in the width direction, the side panel portions 7 protrude from the top panel portion 3 toward a side opposite to the side on which the centers of the arcs of the bent portions 5 are located (downward in FIG. 13A).

Each of the side panel portions 7 extends in the height direction and the longitudinal direction of the press-formed product 1c. That is, the thickness direction of the side panel portion 7 is the same as the width direction of the press-formed product 1c. Thus, when the press-formed product is seen in the height direction, the press-formed product 1c also has an elongated rectangular shape. As illustrated in FIG. 13A, when the press-formed product 1c is seen in the width direction, the side panel portions 7A and 7B overlap each other.

When the press-formed product 1c is seen in the width direction, as illustrated in FIG. 13A, each of the side panel portions 7A and 7B has a substantially sectoral shape. The center of the arc of the upper end portion of each side panel portion 7 (the bending line 13 of each bent portion 5) and the center of the arc of the lower end portion of the side panel portion 7 are located above the top panel portion 3 and are the same as each other. The radius of curvature of the arc of the upper end portion of each side panel portion 7 is smaller than the radius of curvature of the arc of the lower end portion of the side panel portion 7. The center of the arc of the bottom portion 11 of the recessed portion 9 is located below the top panel portion 3.

As illustrated in FIG. 13A, the depth of the recessed portion 9 (the distance between the bottom portion 11 of the recessed portion 9 and each of the bent portions 5 in the height direction) is the largest at both ends of the press-formed product 1c in the longitudinal direction and gradually decreases toward the center of the press-formed product 1c in the longitudinal direction. For example, at both end portions of the press-formed product 1c in the longitudinal direction, the depth of the recessed portion 9 is the largest and is slightly smaller than the height dimension of the side panel portions 7 (see FIG. 13C).

Here, a simulation result showing the amount of springback after the press-formed product 1c has been formed will be described. As can be seen from FIG. 14A, the amount of springback of the press-formed product 1c is smaller than that of the existing press-formed product 300 illustrated in FIG. 20A.

For example, the maximum springback amount of the existing press-formed product 300 is 6.48 mm, while the maximum springback amount of the press-formed product 1c is 2.59 mm.

Fifth Embodiment

Figure 16A:
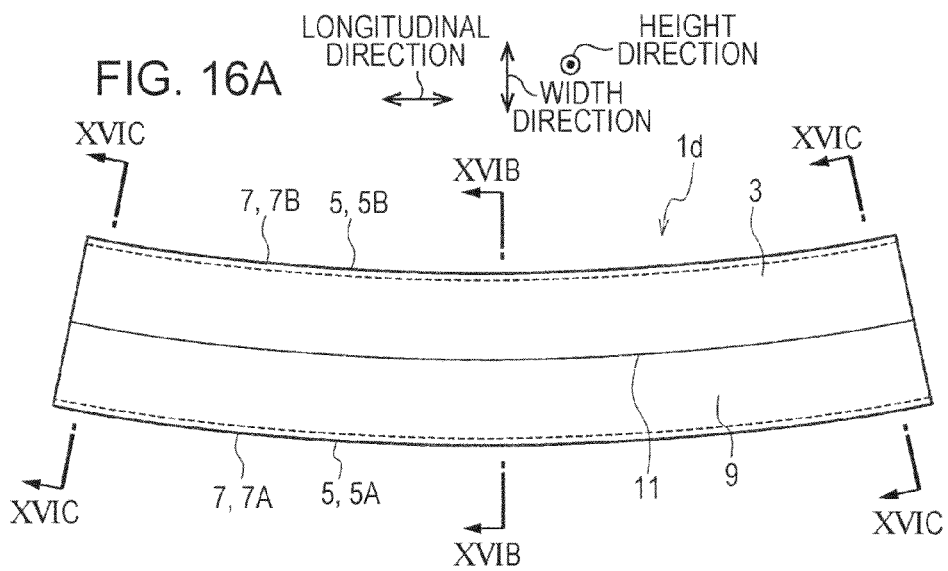
FIG. 16A is a plan view of the press-formed product according to the fifth embodiment of the present invention.
Figure 16B:
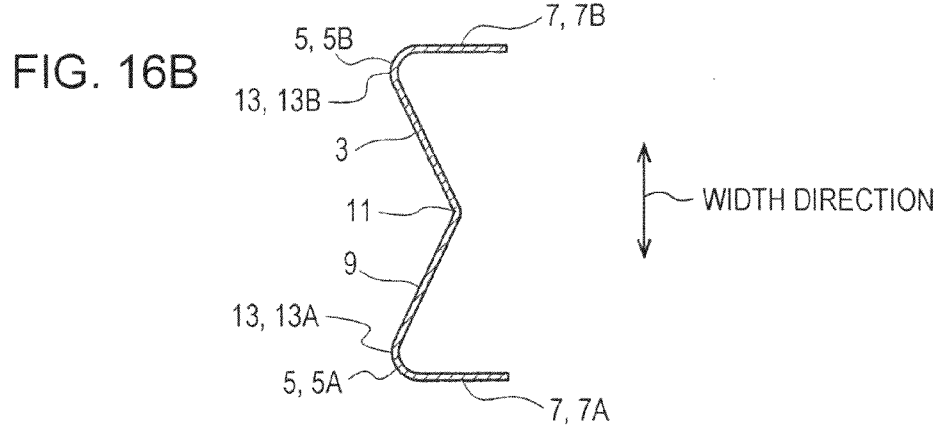
FIG. 16B is a sectional view taken along line XVIB-XVIB of FIG. 16A.
Figure 16C:
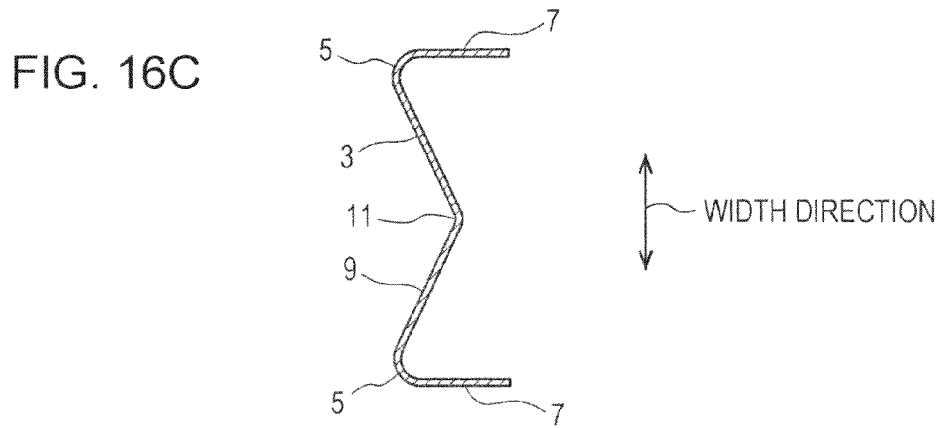
FIG. 16C is a sectional view taken along line XVIC-XVIC of FIG. 16A.

FIGS. 15 to 16C illustrate a press-formed product 1d according to a fifth embodiment, which differs from the press-formed product 1 according to the first embodiment in the manner in which the recessed portion 9 and the like are curved. In other respects, the press-formed product 1d according to the fifth embodiment has the same structure and substantially the same advantage as the press-formed product 1 according to the first embodiment does. The press-formed product 1d according to the fifth embodiment may be modified in the same way as in the case of the press-formed product 1 according to the first embodiment.

In the press-formed product 1d according to the fifth embodiment, the recessed portion 9, which is formed in the top panel portion 3, is curved so as to have an arc shape in such a way that the recessed portion 9 extends parallel to the bent portions 5.

That is, the recessed portion 9 is formed between the bent portions 5A and 5B, the bottom portion 11 of the recessed portion 9 has an arc shape, and the bending line of the bottom portion 11 of the recessed portion 9 is curved in the same direction as the bent portions 5A and 5B (the bending lines 13A and 13B) are curved.

The depth of the recessed portion 9 (the distance between the bottom portion 11 of the recessed portion 9 and each of the bent portions 5 in the height direction) is constant, and the bending line of the bottom portion 11 of the recessed portion 9 extends through the central part, in the width direction, of the press-formed product 1d.

Thus, the cross section of the press-formed product 1d taken along a plane perpendicular to a direction in which the bent portions 5 extend (the longitudinal direction of the press-formed product 1d) is substantially uniformly M-shaped (see FIGS. 16B and 16C).

Figure 17A:
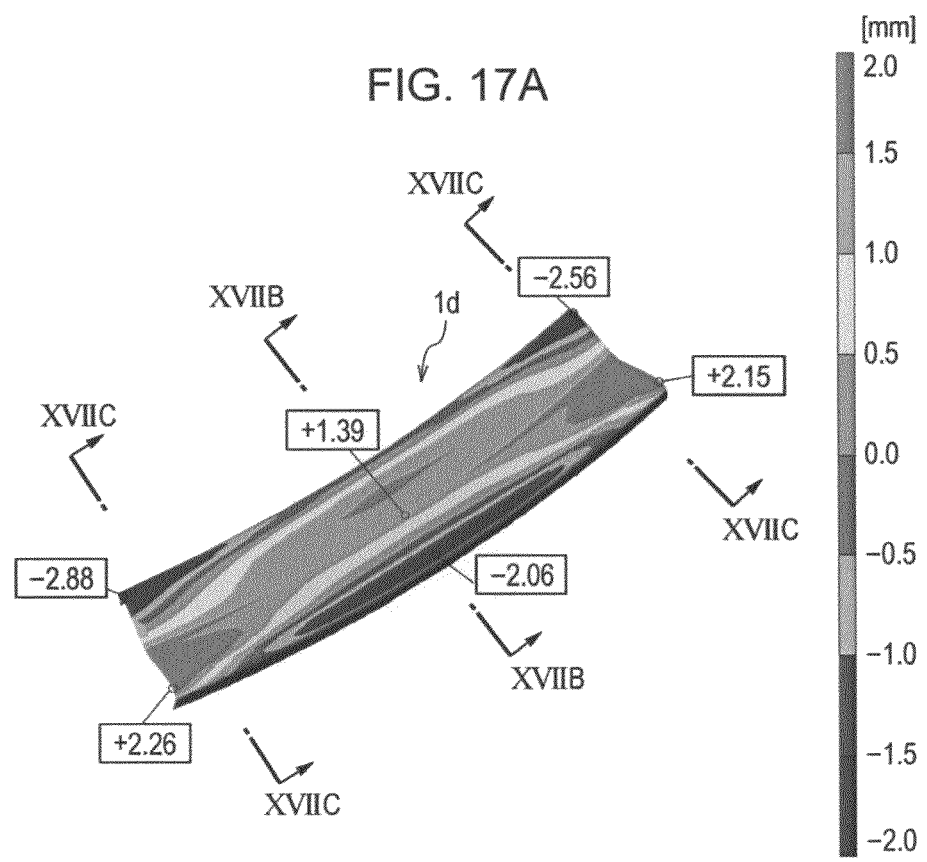
FIG. 17A is a perspective views illustrating the amount of springback of the press-formed product according to the fifth embodiment of the present invention.
Figure 17B:
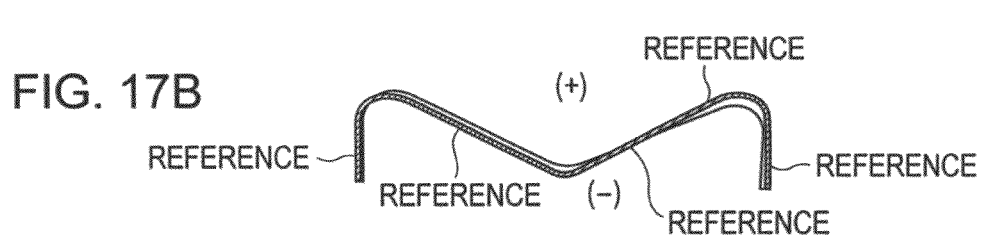
FIG. 17B is a sectional view taken along line XVIIB-XVIIB of FIG. 17A.
Figure 17C:
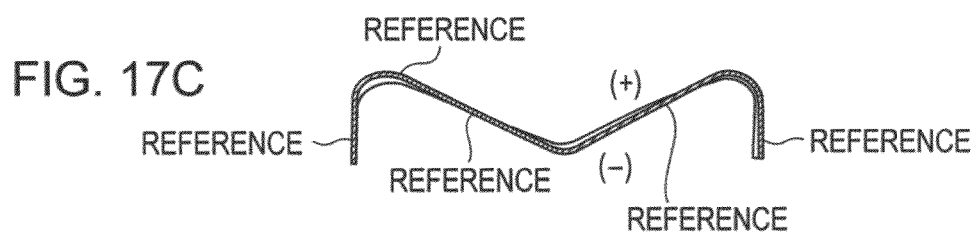
FIG. 17C is a sectional view taken along line XVIIC-XVIIC of FIG. 17A.
Figure 18:
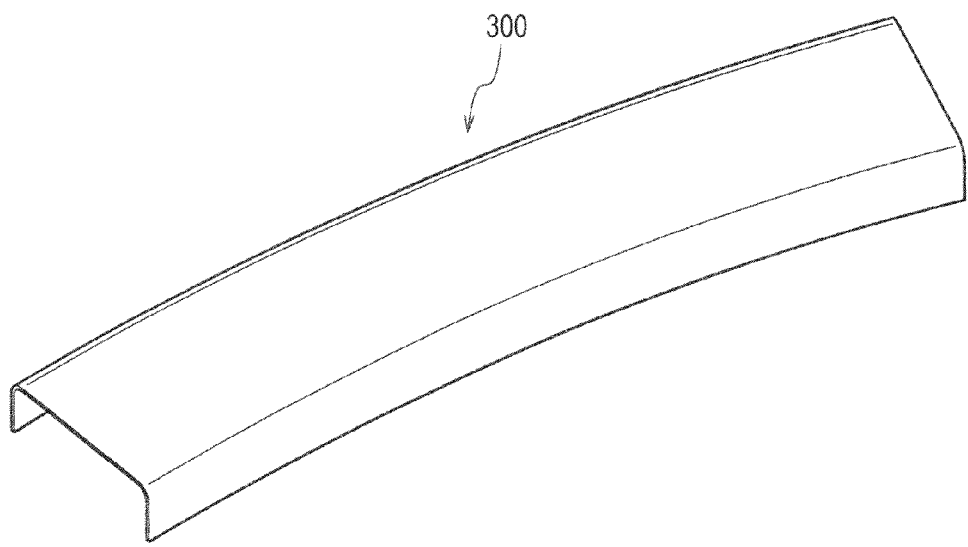
FIG. 18 is a perspective view of an existing press-formed product.
Figure 19A:
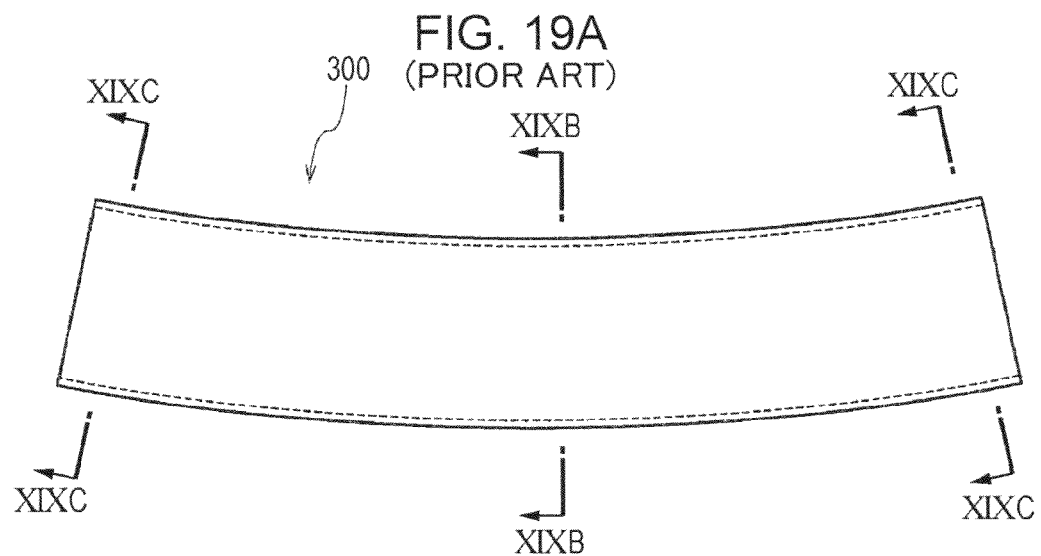
FIG. 19A is a plan view of the existing press-formed product.
Figure 19B:
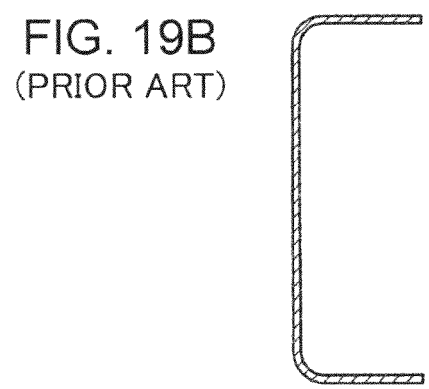
FIG. 19B is a sectional view taken along line XIXB-XIXB of FIG. 19A.
Figure 19C:
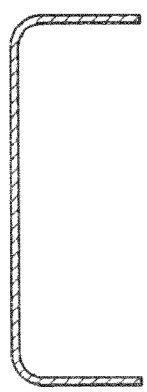
FIG. 19C is a sectional view taken along line XIXC-XIXC of FIG. 19A.

Here, a simulation result showing the amount of springback of the press-formed product 1d after the press-formed product 1d has been formed will be described. As can be seen from FIG. 17A, the amount of springback of the press-formed product 1d is smaller than that of the existing press-formed product 300 illustrated in FIG. 20A.

For example, the maximum springback amount of the existing press-formed product 300 is 6.48 mm, while the maximum springback amount of the press-formed product 1d is 2.88 mm.

The values of the amount of springback of each the press-formed products 1, 1b, 1c, and 1d are more symmetric than those of the existing press-formed product 300. Therefore, the press-formed product 1c can be more easily used than the existing press-formed product 300.

As with the press-formed product 1a, one of the side wall portions may be omitted from each of the press-formed products 1b, 1c, and 1d.

Figure 4A:
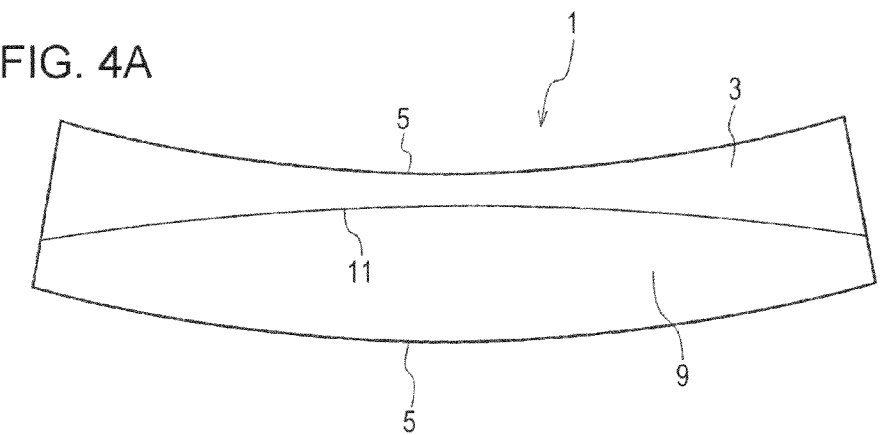
FIG. 4A is a plan view of the press-formed product according to the first embodiment of the present invention, which is similar to FIG. 2A, and FIGS. 4B and 4C are plan views of press-formed products according to modifications.
Figure 4B:
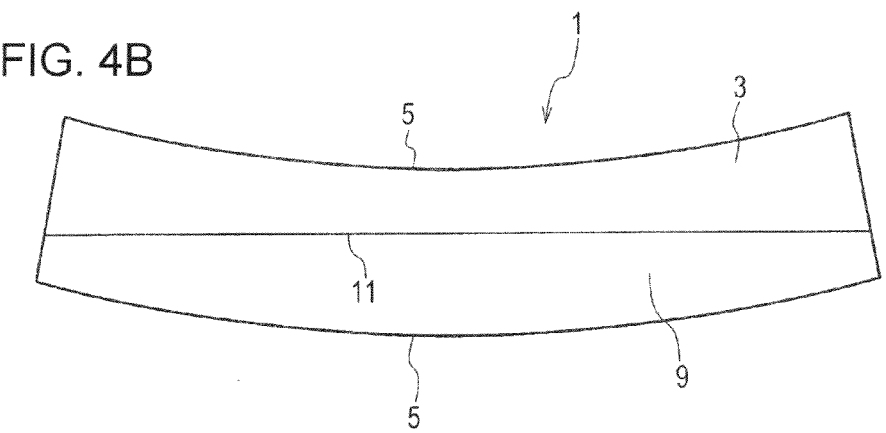
Figure 4C:
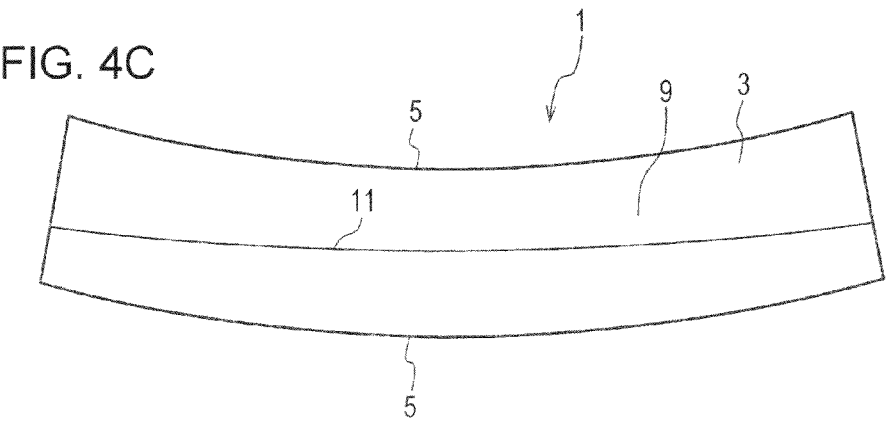

As can be understood from the description using FIGS. 4A to 4C and other figures, the press-formed product described above is an example of a press-formed product having a recessed portion that is formed in a top panel portion and that is curved so as to have an arc shape.

In the press-formed product, the recessed portion may extend nonparallel to the bent portion. For example, the bending line formed at the bottom of the recessed portion may be nonparallel to the bending line of bent portion.

For example, the bending line of the bent portion may be curved so as to have an arc shape and the bending line at the bottom of the recessed portion may be linear (see FIG. 4B). Alternatively, the bending line of the bent portion and the bending line at the bottom of the recessed portion may be curved so as to have arc shapes extending, not in opposite directions, but in the same direction; and the radius of curvature of the bending line of the bent portion may be larger than the radius of curvature of the bending line of the recessed portion (see FIG. 4C).

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A press-formed product comprising:
a top panel portion; and
a side panel portion connected to the top panel portion through a bent portion that is curved so as to have an arc shape in plan view,
wherein the top panel portion includes a recessed portion that is curved so as to have an arc shape in a direction opposite to a direction in which the bent portion is curved in plan view.

2. The press-formed product according to claim 1,
wherein the side panel portion includes a first side panel portion and a second side panel portion,
wherein the bent portion includes a first bent portion formed on one side of the top panel portion and a second bent portion formed on the other side of the top panel portion,
wherein the first side panel portion is connected to the top panel portion through the first bent portion,
wherein the second side panel portion is connected to the top panel portion through the second bent portion, and the second side panel portion protrudes toward the same side that the first side panel portion does, and
wherein the recessed portion is formed between the first and second bent portions, and a bottom portion of the recessed portion has a curvilinear shape that is curved in a direction opposite to a direction in which the first and second bent portions are curved in plan view.

3. The press-formed product according to claim 2,
wherein the first bent portion and the second bent portion are each curved so as to have an arc shape in plan view, and a center of an arc of the bottom portion of the recessed portion and centers of arcs of the first and second bent portions are located opposite each other with the top panel portion therebetween in plan view.

4. The press-formed product according to claim 1,
wherein the side panel portion is disposed on one side of the top panel portion and connected to the top panel portion through the bent portion, and a bottom portion of the recessed portion has a curvilinear shape that is curved in a direction opposite to a direction in which the bent portion is curved in plan view.

5. A press-formed product comprising:
a top panel portion; and
a side panel portion connected to the top panel portion through a bent portion that is curved so as to have an arc shape when seen in a width direction of the press-formed product,
wherein the top panel portion includes a recessed portion that is curved so as to have an arc shape in a direction opposite to a direction in which the bent portion is curved when seen in the width direction of the press-formed product.

6. The press-formed product according to claim 5, wherein the side panel portion includes a first side panel portion and a second side panel portion, wherein the bent portion includes a first bent portion formed on one side of the top panel portion and a second bent portion formed on the other side of the top panel portion, wherein the first side panel portion is connected to the top panel portion through the first bent portion, wherein the second side panel portion is connected to the top panel portion through the second bent portion, and the second side panel portion protrudes toward the same side that the first side panel portion does, and wherein the recessed portion is formed between the first and second bent portions, and a bottom portion of the recessed portion has a curvilinear shape that is curved in a direction opposite to a direction in which the first and second bent portions are curved when seen in the width direction.

7. The press-formed product according to claim 6, wherein the first bent portion and the second bent portion are each curved so as to have an arc shape when seen in the width direction of the press-formed product, and a center of an arc of the bottom portion of the recessed portion and centers of arcs of the first and second bent portions are located opposite each other with the top panel portion therebetween when seen in the width direction of the press-formed product.

8. The press-formed product according to claim 5, wherein the side panel portion is disposed on one side of the top panel portion and connected to the top panel portion through the bent portion, and a bottom portion of the recessed portion has a curvilinear shape that is curved in a direction opposite to a direction in which the bent portion is curved when seen in the width direction.

9. The press-formed product according to claim 5, wherein the bent portion connecting the side panel portion to the top panel portion is curved in a convex direction and wherein the recessed portion is curved in a concave direction.

\* \* \* \* \*